(12) United States Patent
Yamamoto et al.

(10) Patent No.: US 7,713,167 B2
(45) Date of Patent: May 11, 2010

(54) AUTOMATIC TRANSMISSION CONTROL SYSTEM

(75) Inventors: Hideharu Yamamoto, Fujinomiya (JP);
Kenichi Kaizu, Fuji (JP); Hiroshi Sekiguchi, Fuji (JP); Yukiyoshi Inuta, Sagamihara (JP); Hiroki Kumashiro, Fuji (JP)

(73) Assignee: Jatco Ltd, Fuji-shi (JP)

( * ) Notice: Subject to any disclaimer, the term of this patent is extended or adjusted under 35 U.S.C. 154(b) by 542 days.

(21) Appl. No.: 11/686,435

(22) Filed: Mar. 15, 2007

(65) Prior Publication Data
US 2007/0232445 A1    Oct. 4, 2007

(30) Foreign Application Priority Data
Mar. 30, 2006    (JP)    ............................. 2006-092804

(51) Int. Cl.
*F16H 59/00*    (2006.01)
(52) U.S. Cl. .................... 477/98; 475/117; 475/127
(58) Field of Classification Search .................. 475/117
See application file for complete search history.

(56) References Cited

U.S. PATENT DOCUMENTS

| | | | | |
|---|---|---|---|---|
| 5,782,711 A | * | 7/1998 | Tsutsui et al. ............... | 477/156 |
| 5,846,163 A | * | 12/1998 | Kimura et al. ............... | 477/148 |
| 6,517,459 B2 | * | 2/2003 | Saito ........................... | 475/116 |
| 6,729,987 B2 | * | 5/2004 | Sakamoto et al. ........... | 475/117 |
| 7,563,189 B2 | * | 7/2009 | Inuta ........................... | 475/116 |
| 2006/0040790 A1 | * | 2/2006 | Tohta et al. .................. | 477/98 |

FOREIGN PATENT DOCUMENTS

JP    H10-103483    4/1998

* cited by examiner

*Primary Examiner*—David D Le
*Assistant Examiner*—Justin Holmes
(74) *Attorney, Agent, or Firm*—Global IP Counselors, LLP

(57) ABSTRACT

An automatic transmissions control system varies times to start a shift to securing a good response in engagement pressure for an engagement-side frictional element as well as suppressing occurrence of hydraulic pressure vibrations at low temperatures. The control system has an engagement pressure at-low-temperature regulation section that selectively controls at least one of the first and second engagement-pressure regulator valves, when the oil temperature is detected to be lower than a predetermined oil temperature and the shift condition is determined to exist requiring a shift operation such that the first engagement-pressure regulator valve provides a maximum hydraulic pressure to engage the first frictional element to start a shift with the maximum hydraulic pressure being continuously provided until the shift ends, and/or the second engagement-pressure regulator valve provides a minimum hydraulic pressure to obtain complete disengagement of the second frictional element to start a downshift as the shift operation.

11 Claims, 20 Drawing Sheets

FIG.2

|      | LOW/C | 3-5R/C | H/C | L&R/B | 2-6/B | LOW/OWC |
|------|:-----:|:------:|:---:|:-----:|:-----:|:-------:|
| 1ST  | ○ |   |   | ⊗ |   | ● |
| 2ND  | ○ |   |   |   | ○ |   |
| 3RD  | ○ | ○ |   |   |   |   |
| 4TH  | ○ |   | ○ |   |   |   |
| 5TH  |   | ○ | ○ |   |   |   |
| 6TH  |   |   | ○ |   | ○ |   |
| REV  |   | ○ |   | ○ |   |   |

⊗: ENGINE BRAKING

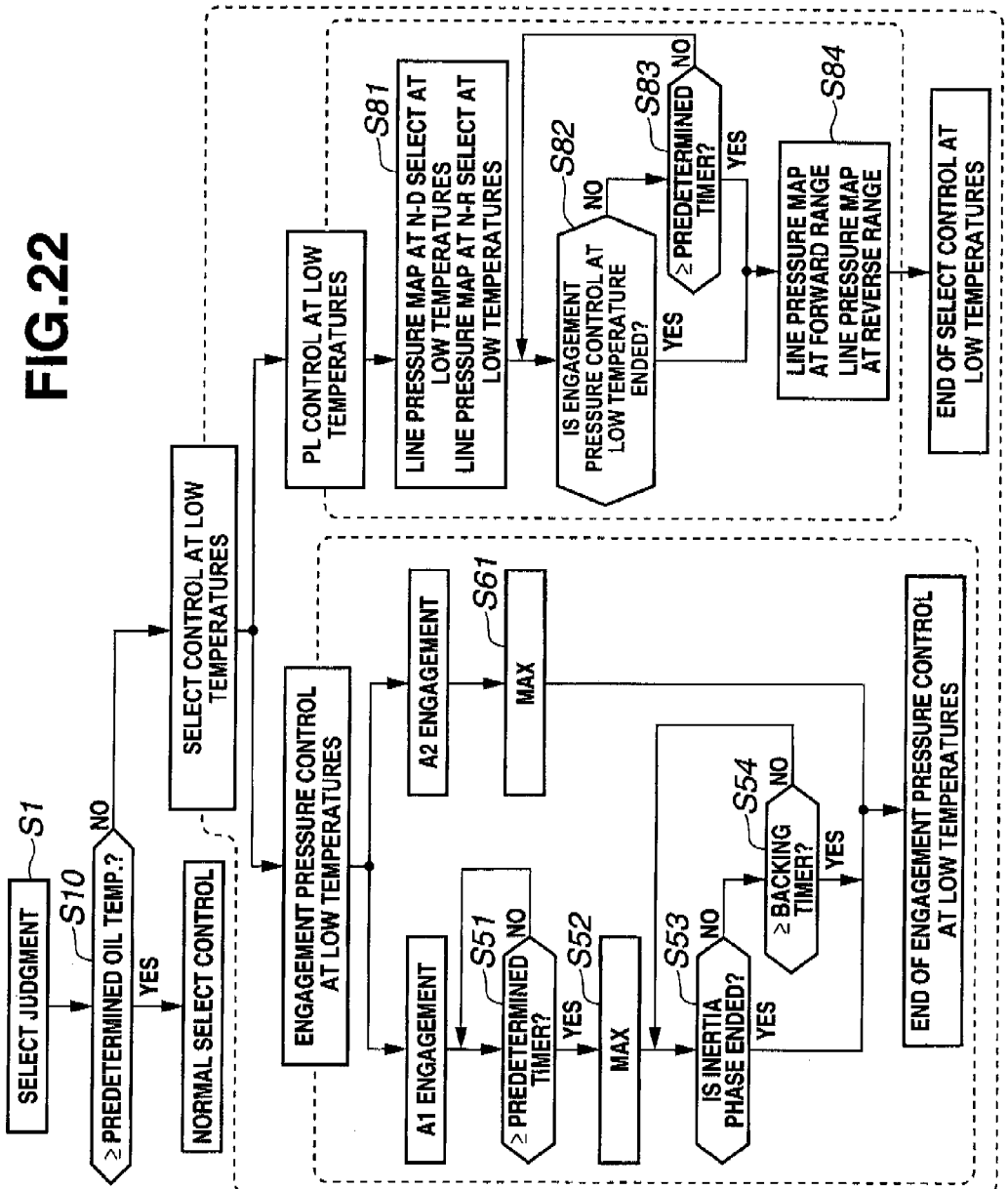

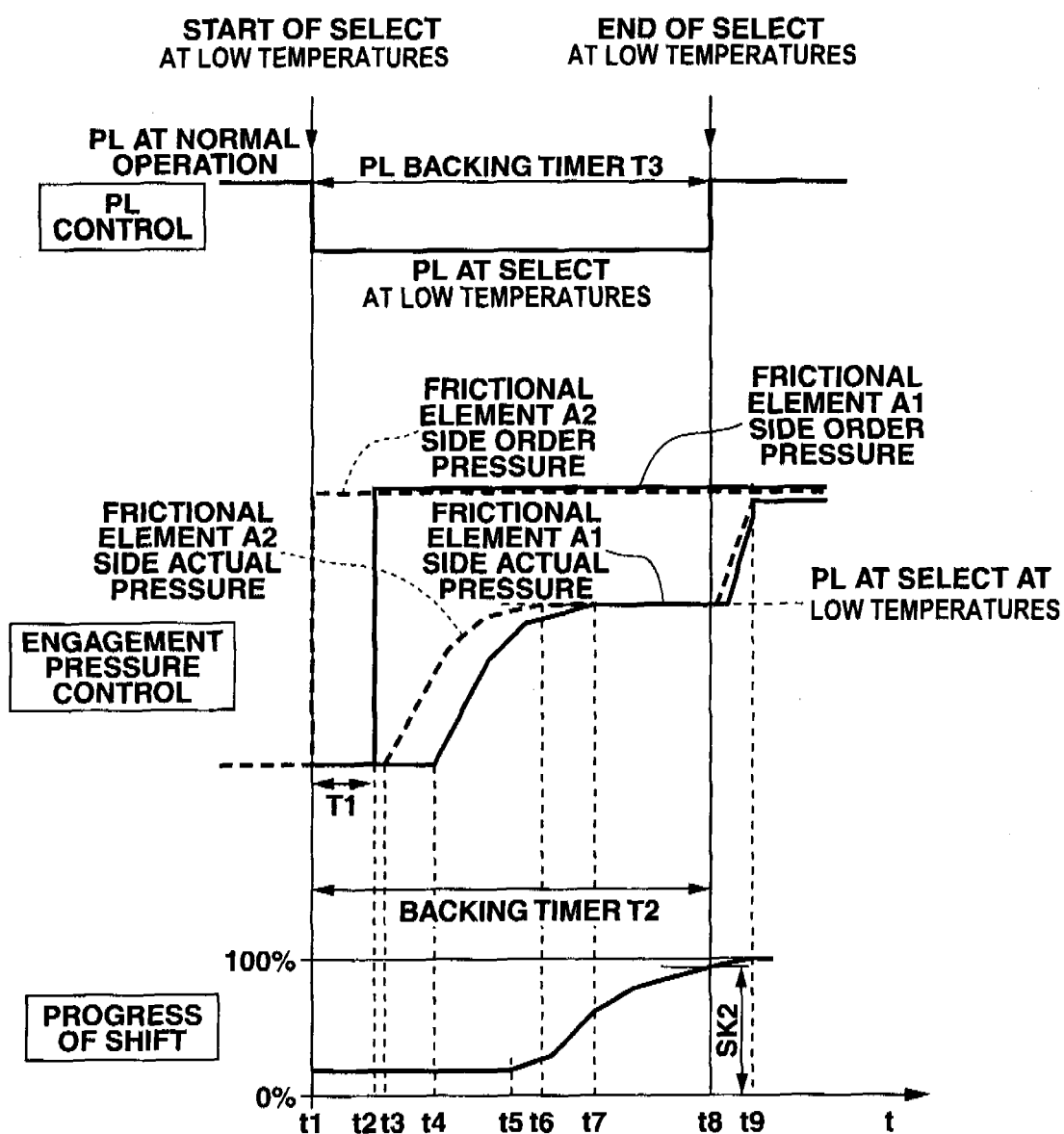

AUTOMATIC TRANSMISSION CONTROL SYSTEM

CROSS-REFERENCE TO RELATED APPLICATIONS

This application claims priority to Japanese Patent Application No. 2006-092804, filed on Mar. 30, 2006. The entire disclosure of Japanese Patent Application No. 2006-092804 is hereby incorporated herein by reference.

BACKGROUND OF THE INVENTION

1. Field of the Invention

The present invention generally relates to control systems for automatic transmissions. More specifically, the present invention relates to an automatic transmission control system that controls the hydraulic pressure in an automatic transmission during shifting at low temperatures.

2. Background Information

Automatic transmissions have been proposed in which hydraulic pressure is controlled at low temperatures during shifting to avoid shift shock. For example, Japanese Patent Application Laid-Open Publication No. 10-103483A discloses an automatic transmission that uses such hydraulic pressure control at low temperatures during shifting to avoid shift shock. In particular, because the fluidity of automatic transmission hydraulic fluid drops at low temperatures, the response characteristics of hydraulic pressure supplied to frictional elements (e.g., clutches, brakes, etc.) are reduced and shift shock occur. In view of this situation, the conventional technology described in this above-mentioned patent publication proposes to determine an end timing of a so-called precharge control based on a rate of change of turbine rotational speed in order to avoid occurrence of rapid engagement shocks.

In view of the above, it will be apparent to those skilled in the art from this disclosure that there exists a need for an improved automatic transmission control system. This invention addresses this need in the art as well as other needs, which will become apparent to those skilled in the art from this disclosure.

SUMMARY OF THE INVENTION

It has been discovered that in the above-mentioned conventional technology, there are several potential problems. First, as taught by the conventional technology, oil pressure vibrations (abbreviated hereinafter as "oil vibrations") occur when a pressure regulator valve for a clutch is operated greatly at low temperatures, for example, equal to or less than −20° C., where the automatic transmission oil has an extremely high viscosity, in the same manner as at normal temperatures by supplying an oil pressure (a high pressure state) from a zero oil pressure (a low pressure state), and then subsequently supplying a maintenance oil pressure (a low pressure state) and supplying an oil pressure for progress of inertia phase (a high pressure state). Thus, at low temperatures when the response characteristics of oil pressure reduce, there is a possibility of loosing control of such oil vibrations once they occur.

Second, at low temperatures, for example, equal to or less than −20° C., where the automatic transmission oil has an extremely high viscosity, there is another problem that time taken for oil pressure to rise varies greatly in addition to the reduction in the response characteristics of oil pressure.

The present invention was contrived in view of the foregoing drawbacks in the above mentioned conventional control system for an automatic transmission. One object of the present invention is to provide a control system for automatic transmissions, which can control the variations of time until the beginning of engagement while securing at least the response characteristics of engagement pressure to the engagement side of a frictional element at low temperatures and control the occurrence of oil pressure variations.

In order to achieve the above mentioned object and other objects of the present invention, an automatic transmission control system is provided that basically comprises a shift determination section, a shift control section, an oil temperature detection section, an oil temperature detection section and an engagement pressure at-low-temperature regulation section. The shift determination section is configured to determine an existence of a shift condition that requires the shift operation in an automatic transmission including at least first and second frictional elements that performs a shift operation by selective engagement of the first frictional element and selective disengagement of the second frictional element. The shift control section is configured to selectively control a line pressure regulator valve that regulates line pressure by draining ejection pressure of an oil pump and first and second engagement-pressure pressure regulator valves that regulate line pressure to provide engagement pressure to the first and second frictional elements. The oil temperature detection section is configured to detect oil temperature within the automatic transmission. The engagement pressure at-low-temperature regulation section is configured to selectively control at least one of the first and second engagement-pressure regulator valves, when the oil temperature detected by the oil temperature detection section is lower than a predetermined oil temperature and the shift determination section determines the existence of the shift condition for requiring the shift operation such that either the first engagement-pressure regulator valve provides a maximum hydraulic pressure to engage the first frictional element to start a shift with the maximum hydraulic pressure being continuously provided until the shift ends, or the second engagement-pressure regulator valve provides a minimum hydraulic pressure to obtain complete disengagement of the second frictional element to start a downshift as the shift operation and the first engagement-pressure regulator valve provides a maximum hydraulic pressure to obtain complete engagement of the first frictional element upon elapse of a predetermined period from the start of the downshift with the maximum hydraulic pressure being continuously provided until the downshift ends.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 2 is a frictional element engagement operating chart showing the state of operation of each of frictional elements in each of shift stages that are established by the automatic transmission control system in accordance with the first embodiment of the present invention;

FIG. 22 is a flow chart showing the operation at the time of low temperature select the automatic transmission control system in accordance with the first embodiment of the present invention; and FIG. 23 is a time chart showing the hydraulic pressure characteristic at the time of low temperature select the automatic transmission control system in accordance with the first embodiment of the present invention.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
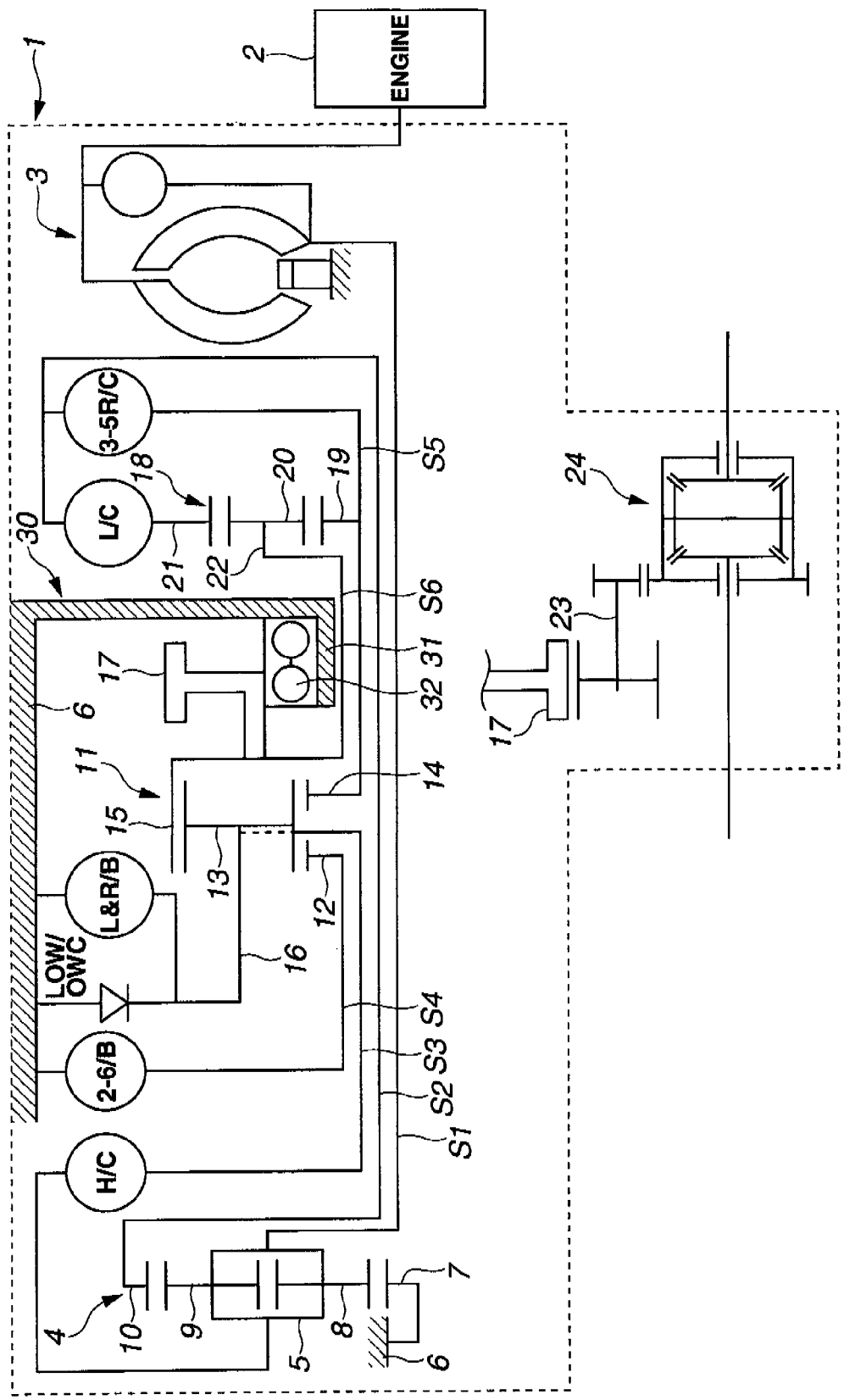
FIG. 1 is a simplified schematic view (skeleton diagram) of an automatic transmission with six (6) forward gears and one (1) reverse gear that can be achieved by an automatic transmission control system in accordance with a first embodiment of the present invention.

Referring initially to FIG. 1, an automatic transmission 1 is illustrated in accordance with a first embodiment of the present invention. FIG. 1 is a simplified schematic view (skeleton diagram) of the automatic transmission 1 having six (6) forward gears and one (1) reverse gear that can be achieved by an automatic transmission control system in accordance with a first embodiment of the present invention. As shown in FIG. 1, the automatic transmission 1 receives power of an engine 2. In particular, the rotational output of the engine 2 is fed to a torque converter 3 of the automatic transmission 1. The rotational output of the torque converter 3 is fed to a double-pinion type planetary gear mechanism 4 via a rotary shaft S1.

Here, the double-pinion type planetary gear mechanism 4 is disposed in a transmission case 6 of the automatic transmission 1. The double-pinion type planetary gear mechanism 4 basically includes a carrier 5, a sun gear 7, a plurality of inner diameter side pinion gears 8, a plurality of outer diameter side pinion gears 9, and a ring gear 10. The rotational output of the torque converter 3 is fed to the carrier 5 via the rotary shaft S1.

The sun gear 7 is fixed to the transmission case 6. The inner diameter side pinion gears 8 mesh with the sun gear 7. The outer diameter side pinion gears 9 mesh with the inner diameter side pinion gears 8. The ring gear 10 meshes with the outer diameter side pinion gears 9 and is arranged coaxially with the sun gear 7. The carrier 5 supports the inner diameter side pinion gears 8 and the outer diameter side pinion gears 9 for rotation about their axes.

The ring gear 10 is connected to a rotary shaft S2 that extends toward the side of the engine 2 after passing through an area surrounded by an inner diameter side of an output gear 17 that covers the periphery of a rotary shaft S1 mentioned later.

Again, the carrier 5 is connected via a high clutch H/C to a rotary shaft S3 that covers the periphery of the rotary shaft S2 and extends toward the side of the engine 2.

That end portion of the rotary shaft S3 which is on the side opposite to the side where the high clutch H/C is connected to the rotary shaft S3 is connected to a carrier 16 that supports pinion gears 13 of a single pinion type planetary mechanism 11. The carrier 16 is connected to the transmission case 6 via a low & reverse brake L&R/B and a low one-way clutch LOW/OWC arranged in parallel. By this parallel arrangement, the carrier 16 is supported with respect to the transmission case 6 for rotation in one direction and its rotation can be regulated (fixed) or deregulated.

The single pinion type planetary gear mechanism 11 is formed by the pinion gears 13 which mesh not only with a second sun gear 14 disposed on the side of the engine 2 and with a first sun gear 12 disposed on the side opposite to the side of the engine 2 but also with a ring gear 15.

The first sun gear 12 is connected to a rotary shaft S4 that extends in a direction opposite to the direction toward the engine 2 and covers the periphery of the rotary shaft S3, and the rotary shaft S4 is connected to the transmission case 6 via a 2-6 brake 2-6/B. By this arrangement, the rotary shaft S4 can be fixedly connected to or disconnected from the transmission case 6.

The second sun gear 14 is connected to a rotary shaft S5 that extends past the inner diameter side of an output gear 17 toward the side of the engine 2 and covers the periphery of the rotary shaft S2, and the rotary shaft S5 is connectable to the rotary shaft S2 via a 3-5 reverse clutch 3-5R/C and it is connectable to a ring gear 21 of a single pinion type planetary gear mechanism 18 via a low clutch LOW/C.

Here, the single pinion type planetary gear mechanism 18 is disposed around the periphery side of the rotary shaft S5 and between the output gear 17 and a 3-5 reverse clutch 3-5R/C. The single pinion type planetary gear mechanism 18 includes a sun gear 19 connected to the rotary shaft S5, a ring gear 21 disposed around the outer diameter side of the sun gear 19, and a plurality of pinion gears 20 meshing with the sun gear 19 and the ring gear 21. The pinion gears 20 are supported by a carrier 22.

The carrier 22 is connected to the ring gear 15 of the single pinion type planetary gear mechanism 11 via a rotary shaft S6 that covers the periphery side of the rotary shaft S5 and passes through an area on the inner diameter side of the output gear 17.

Between the single pinion type planetary gear mechanism 11 and the single pinion type planetary gear mechanism 18 is arranged a bearing support portion 30. The bearing support portion 30 is a partition shaped part that is integral with the transmission case 6 and has a bearing carrier portion 31 that is of a cylinder extending along the rotary shaft S6.

Bearings 32 are fitted on the periphery of the bearing carrier portion 31, and the output gear 17 connected to the ring gear 15 is contact with the peripheral portion (an outer race) of the bearings 32. On the inner diameter side of the bearing carrier portion 31, a pile of the coaxial rotary shafts S2, S2, S5 and S6 forms a multiplex structure.

And, the automatic transmission 1 performs automatic shift control among six forward gears at a D range position based on a driving point, which determined by vehicle speed and throttle opening degree, and a shift schedule (a shift map), and shift control to a reverse first gear by operation to select a R range position from the D range position.

In this case, selecting one of various combinations of engagement and disengagement of the high clutch H/C, the 2-6 brake 2-6/B, the low & reverse brake L&R/B (low one-way clutch LOW/OWC), the low clutch LOW/C, and the 3-5 reverse clutch 3-5R/C causes the automatic transmission 1 to change an output rpm of the engine 2 to a desired rpm, which is transmitted from the output gear 17 to a drive wheel of the vehicle (not illustrated) via the counter shaft 23 and the differential gear 24.

FIG. 2 shows the operation state of each of the frictional elements in this shift control. In FIG. 2, a circle mark ○ represents engagement, no mark represents disengagement, an encircled X mark Ⓧ represents engagement but operating at the time of engine braking, and a shadowed circle mark with hatching represents mechanical engagement (regulation of rotation) operating at the time of engine driving.

First gear ($1^{st}$) is achieved by engaging the low clutch LOW/C and engaging the low & reverse brake L&R/B or the low one-way clutch LOW/OWC. At the D range position, a rotation received from the input shaft (rotary shaft S1) and reduced via the double pinion type planetary gear mechanism 4 is delivered from the rotary shaft S2 via the engaged low clutch LOW/C and the ring gear 21 of the single pinion type planetary gear mechanism 18 to the carrier 22. The rotation of the carrier 22 is transmitted to the ring gear 15, but the rotation of the ring gear 15 is reduced because the carrier 16 that is fixed to the transmission case 6 by the engagement of the low one-way clutch LOW/OWC receives a reaction force, with the result that a rotation reduced at the maximum reduction ratio is outputted from the output gear 17. In addition, at the time of engine braking, the low & reverse brake L&R/B receives a reaction force instead of the racing low one-way clutch LOW/OWC.

Second gear ($2^{nd}$) is achieved by engaging the low clutch LOW/C and 2-6 brake 2-6/B. In the second gear, a rotation received from the input shaft (rotary shaft S1) and reduced via the double pinion type planetary gear mechanism 4 is delivered from the rotary shaft S2 via the engaged low clutch LOW/C and the ring gear 21 of the single pinion type planetary gear mechanism 18 to the carrier 22. On one hand, the first sun gear 12 and pinion gears 13 are fixed to the transmission case 6 by the 2-6 brake 2-6/B. In addition, the rotary shaft S5 connected to the second sun gear 14 is fixed to the transmission case 6 because the pinion gears 13 mesh with the second sun gear 14.

Third gear ($3^{rd}$) is obtained by engaging the 3-5 reverse clutch 3-5R/C and the low clutch LOW/C, fourth gear ($4^{th}$) is obtained by engaging the high clutch H/C and low clutch LOW/C. In addition, fifth gear ($5^{th}$) is obtained by engaging the high clutch H/C and the 3-5 reverse clutch 3-5R/C.

Sixth gear ($6^{th}$) is obtained by engaging the high clutch H/C and the 2-6 brake 2-6/B. In addition, in the sixth gear, the rotary shaft S5 is fixed by engaging the 2-6 brake 2-6/B similarly to the second gear. In addition, the reverse gear (REV) is obtained by engaging the 3-5 reverse clutch 3-5R/C and the low & reverse brake L&R/B.

Hydraulic Circuit and Electronic Shift Control System

Figure 3:
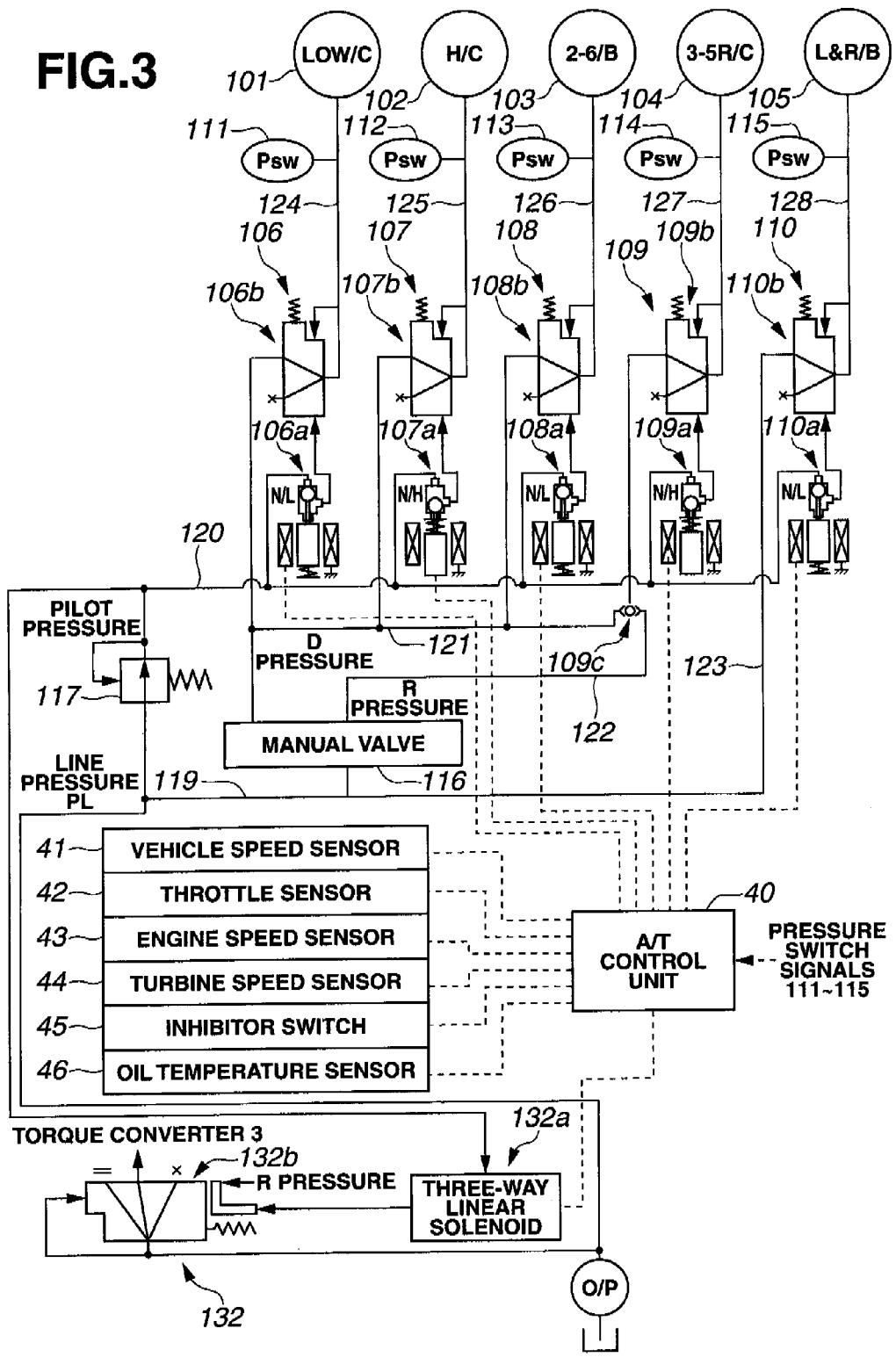
FIG. 3 is a diagrammatic view of a hydraulic circuit and an electronic shift control system in accordance with the first embodiment of the present invention.

Next, referring to FIG. 3, there is description on the hydraulic circuit and electronic shift control system which accomplish the above-mentioned shift control. In FIG. 3, the hydraulic circuit is provided with an engagement piston chamber 101 of the low clutch LOW/C, an engagement piston chamber 102 of the high clutch H/C, an engagement piston chamber 103 of the 2-6 brake 2-6/B, an engagement piston chamber 104 of the 3-5 reverse clutch 3-5R/C, and an engagement piston chamber 105 of the low & reverse brake L&R/B.

The low clutch LOW/C, the high clutch H/C, the 2-6 brake 2-6/B, the 3-5 reverse clutch 3-5R/C, and the low & reverse brake L&R/B are engaged when a line pressure PL, a D range pressure or a R range pressure are supplied to each of their engagement piston chambers 101~105, and disengaged when these engagement pressures are drained from each of them.

Further, the D range pressure is the line pressure PL via a manual valve 116 and occurs only at the time of selection of a D range. The R range pressure is the line pressure PL via the manual valve 116 and occurs only at the time of selection of an R range, and it will not occur at the time of selection of ranges other than the R range because of connection to a drain port.

In the hydraulic circuit illustrated in FIG. 3, a first hydraulic control valve 106 is provided that controls an engagement pressure (a low clutch pressure) supplied to the low clutch LOW/C. Also a second hydraulic control valve 107 is provided controls an engagement pressure (a high clutch pressure) supplied to the high clutch H/C. Also a third hydraulic control valve 108 is provided that controls an engagement pressure (a 2-6 brake pressure) supplied to the 2-6 brake 2-6/B. Also a fourth hydraulic control valve 109 is provided that controls an engagement pressure (a 3-5 reverse clutch pressure) supplied to the 3-5 reverse clutch 3-5R/C. Further a fifth hydraulic control valve 110 is provided that controls an engagement pressure (a low & reverse brake pressure) supplied to the low & reverse brake L&R/B. Finally, a line pressure control valve 132 is also provided that controls the line pressure PL.

The first hydraulic control valve 106 is composed of a first duty solenoid 106a and a first pressure regulator valve 106b. The first duty solenoid 106a produces a solenoid pressure using a pilot pressure as a base pressure. The first pressure regulator valve 106b, regulates the D range pressure to the low clutch pressure using the solenoid pressure from the first duty solenoid 106a as an operation signal pressure and letting this low clutch pressure act thereon as a feedback pressure. In addition, the first duty solenoid 106a is controlled depending on a duty ratio, causing, to be concrete, the first pressure regulator valve 106b to set the low clutch pressure at zero at the time of solenoid OFF and to raise the low clutch pressure when the ON duty ratio increases at the time of solenoid ON.

The second hydraulic control valve 107 is composed of a second duty solenoid 107a and a second pressure regulator valve 107b. The second duty solenoid 107a produces a solenoid pressure using the pilot pressure as a base pressure. The second pressure regulator valve 107b regulates the D range pressure to the high clutch pressure using the solenoid pressure from the second duty solenoid 107a as an operation signal pressure and letting this high clutch pressure act thereon as a feedback pressure. In addition, the second duty solenoid 106a causes the second pressure regulator valve 107b to set the high clutch pressure at zero at the time of solenoid ON (100% ON duty ratio), to raise the high clutch pressure when the ON duty ratio decreases, and to maximize the high clutch pressure at the time of solenoid OFF.

The third hydraulic control valve 108 is composed of a third duty solenoid 108a and a third pressure regulator valve 108b. The third duty solenoid 108a produces a solenoid pressure using the pilot pressure as a base pressure. The third pressure regulator valve 108b regulates the D range pressure to the 2-6 brake pressure using the solenoid pressure from the third duty solenoid 108a as an operation signal pressure and letting this 2-6 brake pressure act thereon as a feedback pressure. In addition, the third duty solenoid 108a causes the third pressure regulator valve 108b to set the 2-6 brake pressure at zero at the time of solenoid OFF, and to raise the 2-6 brake pressure when the ON duty ratio increases at the time of solenoid ON.

The fourth hydraulic control valve 109 is composed of a fourth duty solenoid 109a and a fourth pressure regulator valve 109b. The fourth duty solenoid 109a produces a solenoid pressure using the pilot pressure as a base pressure. The fourth pressure regulator valve 109b regulates the D range pressure to the 3-5 reverse clutch pressure using the solenoid pressure from the fourth duty solenoid 108a as an operation signal pressure and letting this 3-5 reverse clutch pressure act thereon as a feedback pressure. In addition, the fourth pressure regulator valve 109b regulates the R range pressure to the 3-5 reverse clutch pressure at the time of selection of the R range. In addition, the fourth duty solenoid 109a causes the fourth pressure regulator valve 109b to set the 3-5 reverse clutch pressure at zero at the time of solenoid ON (100% ON duty ratio), to raise the 3-5 reverse clutch pressure when the ON duty ratio decreases, and to maximize the 3-5 reverse clutch pressure at the time of solenoid OFF.

By the way, on a supply hydraulic circuit to the fourth hydraulic control valve 109, there is a shuttle ball 109c that serves as a ball valve for two-direction change. This shuttle ball 109c changes so as to output only one of the D range pressure and R range pressure to the fourth hydraulic control valve 109.

The fifth hydraulic control valve 110 is composed of a fifth duty solenoid 110a and a fifth pressure regulator valve 110b. The fifth duty solenoid 110a produces a solenoid pressure using the pilot pressure as a base pressure. The fifth pressure regulator valve 110b regulates the line pressure PL to the low & reverse brake pressure using the solenoid pressure from the fifth duty solenoid 110a as an operation signal pressure and letting this low & reverse brake pressure act thereon as a feedback pressure. In addition, the fifth duty solenoid 110a causes the fifth pressure regulator valve 110b to set the low & reverse brake pressure at zero at the time of solenoid OFF, and to raise the low & reverse brake pressure when the ON duty ratio increases at the time of solenoid ON.

The line pressure control valve 132 is composed of a linear solenoid 132a and a line pressure regulator valve 132b. The linear solenoid 132a is a three-way proportional electromagnetic valve, which produces a solenoid pressure using the pilot pressure as a base pressure. The line pressure regulator valve 132b regulates the ejection pressure of the oil pump O/P, by draining it, to the line pressure PL using the solenoid pressure from the linear solenoid 132a as an operation signal pressure and letting this line pressure act thereon as a feedback pressure. In addition, the linear solenoid 132a causes the line pressure regulator valve 132b to maximize the line pressure PL at the time of current OFF, and to decrease the line pressure PL when the current increases. The oil drained from the line pressure regulator valve 132b is outputted, as a first drain, to be supplied, as a converter pressure, to the torque converter 3, and, as a second drain, to be returned to a suction port of the oil pump O/P.

In FIG. 3, the hydraulic circuit is provided with a first pressure switch 111, a second pressure switch 112, a third pressure switch 113, a fourth pressure switch 114, a fifth pressure switch 115, a manual valve 116, a pilot pressure 117, a line pressure oil passage 119, a pilot pressure oil passage 120, a D range pressure oil passage 121, a R range pressure oil passage 122, a low clutch pressure oil passage 124, a high clutch oil passage 125, a 2-6 brake pressure oil passage 126, a 3-5 reverse clutch pressure oil passage 127, and a low & reverse brake pressure oil passage 128.

The first to the fifth pressure switches 111~115 are established on the low clutch pressure oil passage 124, the high clutch pressure oil passage 125, the 2-6 brake pressure oil passage 126, the 3-5 reverse clutch pressure oil passage 127, and the low & reverse brake pressure oil passage 128, respectively, in order to detect whether or not the engagement pressure is present as a switch signal (ON when the engagement pressure is present, OFF when the engagement pressure is absent).

In FIG. 3, the electronic shift control system is provided with an A/T control unit 40, a vehicle speed sensor 41, a throttle sensor 42, an engine speed (rpm.) sensor 43, a turbine speed (rpm.) sensor 44, an inhibitor switch 45 that detects a lever operation by the driver, and an oil temperature sensor 46.

The A/T control unit 40 inputs a switch signal from each of the pressure switches 111~115 and a signal from each of the sensors or switches 41~46, processes calculation based on these pieces of input information and preset shift control rules and failsafe rules, and outputs solenoid drive signals along with the results of processed calculation to the first duty solenoid 106a, the second duty solenoid 107a, the third duty solenoid 108a, the fourth duty solenoid 109a, the fifth duty solenoid 110a, and the linear solenoid 132a. The detail of the A/T control unit 40 will be described later.

Based on FIGS. 4~8, there is description on the structures of the pressure regulator valves 106b~110b, each pressure regulating the engagement pressure, and also on the structure of the line pressure regulator 132b.

Figure 4:
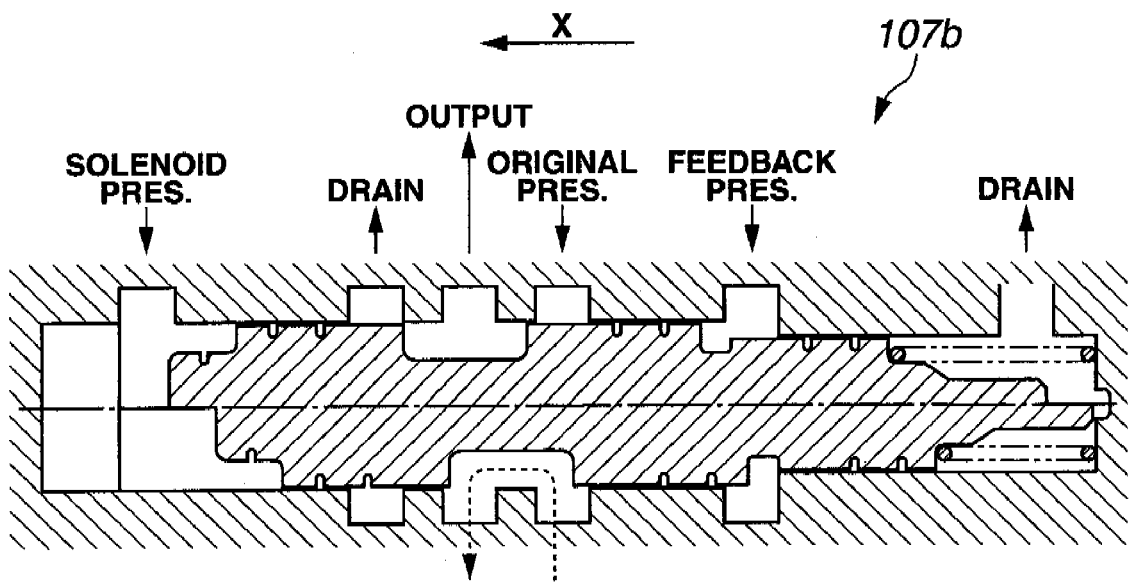
FIG. 4 is an axial direction section of a pressure regulator valve for engagement pressure applied to a frictional element in accordance with the first embodiment of the present invention.
Figure 5:
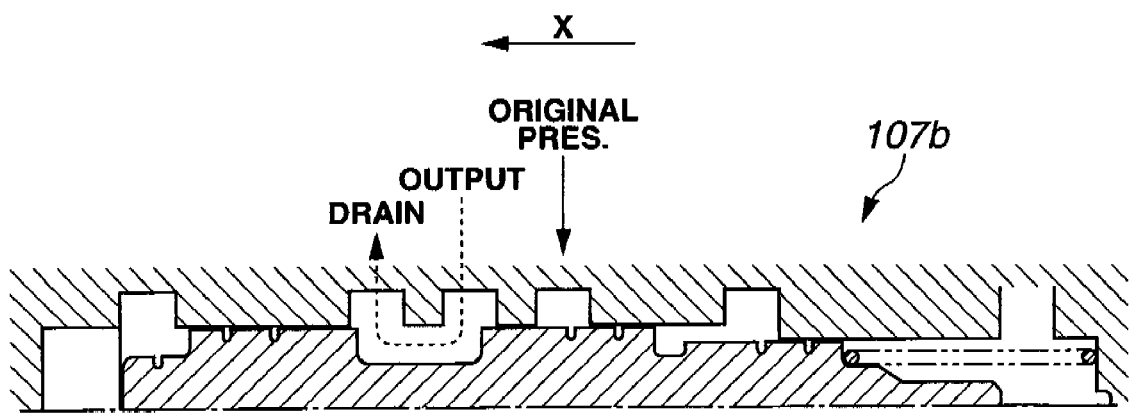
FIG. 5 is an axial direction section of a pressure regulator valve for engagement pressure applied to a frictional element in accordance with the first embodiment of the present invention.

FIGS. 4 and 5 are axial direction sections of the second pressure regulator valve 107b. Basically, the second pressure regulator valve 107b regulates the engagement pressure to a desired oil (or hydraulic) pressure by regulating a ratio between an inflow of oil from an original pressure port to an output port and an outflow of oil from the output port to a drain port. Further, as described below, the second pressure regulator valve 107b is set such that the maximum of engagement pressure (discharged from the output port) is equal to the maximum of line pressure PL (inputted from the original pressure port).

In detail, settings are such that an x-axis is in an axial direction of a valve spool and has a minus direction toward the side where a spring is. From the side toward which the x-axis has a plus direction, there are a solenoid pressure port, a drain port, an output (high clutch pressure) port, an original pressure (D range pressure=line pressure PL), and an output feedback pressure port arranged in this order.

The second pressure regulator valve 107b controls the state of communication between the original pressure port and the output port and the state of communication between the output port and the drain port in order to regulate the engagement pressure to a desired oil pressure in an equilibrium state established when a force, which is derived from a solenoid pressure delivered by the second duty solenoid 107a as an operation signal pressure, to press the spool in the minus direction of the x-axis balances with forces, which are derived from the spring and from a feedback pressure delivered via the high clutch oil passage, to press the spool in the plus direction of the x-axis.

The solenoid pressure that is the operating signal pressure becomes the highest when the second duty solenoid 107a is in the state of solenoid OFF. When this operating signal pressure is outputted, if the line pressure PL, is lower than the oil pressure (the maximum of engagement pressure) which is determined by this highest solenoid pressure, the spool is displaced to the maximum in the minus direction of the x-axis to the position as indicated by the lower half of the section shown in FIG. 4 to allow the original pressure port to communicate with the output port and to open the original pressure port to the maximum. Therefore, the output (high clutch pressure) becomes the highest and as high the original pressure (D range pressure=line pressure PL).

On the other hand, the solenoid pressure becomes the lowest when the second duty solenoid 107a is in the state of solenoid ON. Then, the spool is displaced to the maximum in the positive direction of the x-axis to the position as indicated by the upper half of the section shown in FIG. 5 to allow the output port to communicate with the drain port and to open the drain port to the maximum. In other words, the output (high clutch pressure) becomes the lowest, that is, zero.

In addition, there is omitted description on the other pressure regulator valves 106b, 108b~110b because they have generally similar structures.

Figure 6:
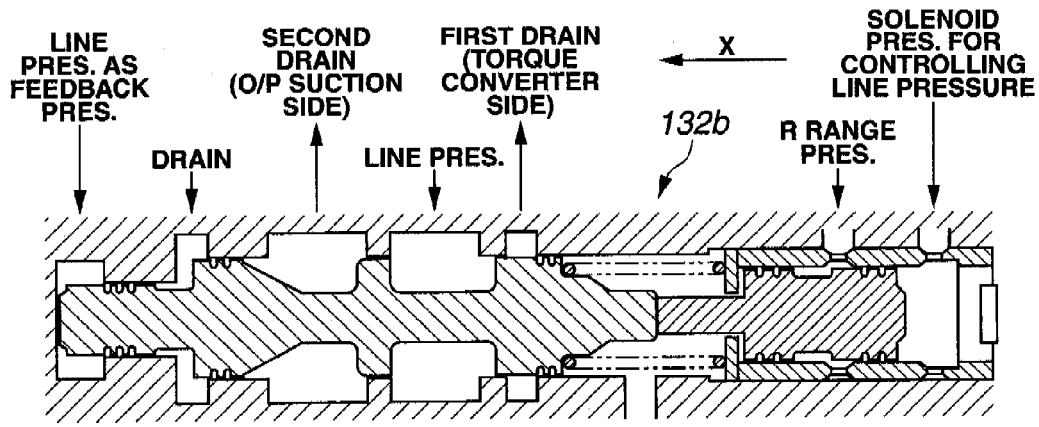
FIG. 6 is an axial direction section of a line pressure regulator valve in accordance with the first embodiment of the present invention.
Figure 7:
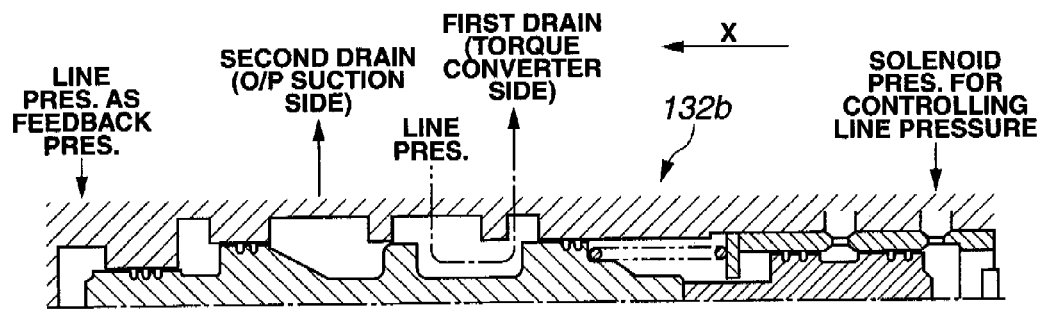
FIG. 7 is an axial direction section of a line pressure regulator valve in accordance with the first embodiment of the present invention.
Figure 8:
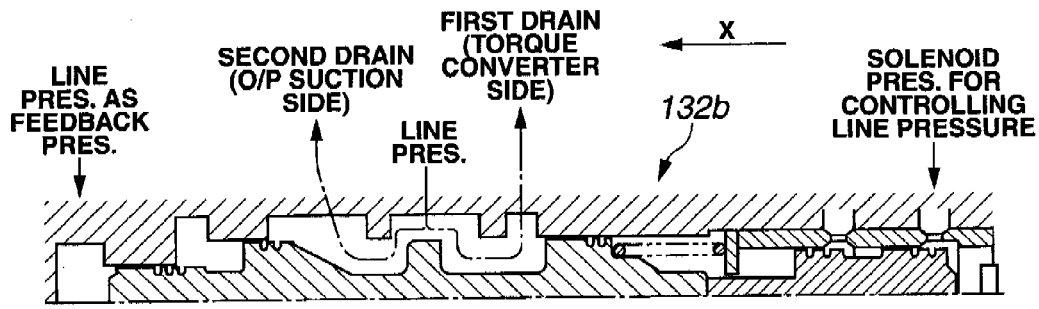
FIG. 8 is an axial direction section of a line pressure regulator valve in accordance with the first embodiment of the present invention.

FIGS. 6~8 are axial direction sections of the line pressure regulator valve 132b. Basically, the line pressure regulator valve 132b regulates the ejection pressure of the oil pimp O/P to a desired line pressure PL by regulating only a flow from a line pressure port to drain ports (a first drain port and a second drain port).

In detail, settings are such that an x-axis is in an axial direction of the valve spool and has a minus direction toward the side where a spring is. From the side toward which the x-axis has a plus direction, there are a line pressure PL feedback port, a drain port, a second drain port (drain toward the oil pump suction side), a line pressure PL port, a first drain port (drain as a torque converter pressure), an R range pressure port, which an R range pressure acts on at the time of selection of the R range to change the characteristics of the pressure regulator valve with respect to the operating signal pressure, and a solenoid pressure port for a solenoid pressure, as an operating signal pressure, for controlling the line pressure arranged in this order.

The line pressure regulator valve 132b controls the state of communication between the line pressure port and the first drain port and the state of communication between the line pressure port and the second drain port in an equilibrium state established when forces, which are derived from the spring and from a solenoid pressure delivered by the linear solenoid 132a, to press the spool in the plus direction of the x-axis balance with a force, which is derived from the oil pump ejection pressure feedback pressure, to press the spool in the minus direction of the x-axis.

The solenoid pressure becomes the highest when the linear solenoid 132a is in the state of current OFF. Then, for example, in the range where the engine speed (rpm) is low and discharge of the oil pump O/P is not sufficient, the spool is displaced to the maximum in the plus direction of the x-axis to the position as indicated by the section shown in FIG. 6, preventing the line pressure port from communicating with the first drain port and the second drain port neither. Therefore, the ejection pressure of the oil pump O/P is supplied, unaltered, as the line pressure PL because the oil ejected by the oil pump is not drained.

On the other hand, for example, in the range where the engine speed (rpm) is high and sufficient discharge of the oil is secured, when the solenoid pressure from the linear solenoid 132a is the highest or lower than it, the spool is displaced in the minus direction of the x-axis as indicated by the section shown in FIG. 7 to allow the line pressure port to communicate with the first drain port, draining a portion of the line pressure PL as the torque converter pressure.

In addition, when the relation between the solenoid pressure from the linear solenoid 132a and the ejection pressure of the oil pump demands more than the first drain port can drain, the spool is displaced further in the minus direction of the x-axis as indicated by the section shown in FIG. 8, allowing the line pressure port to communicate with the second drain port as well as the first drain port.

Shift Control

Figure 9:
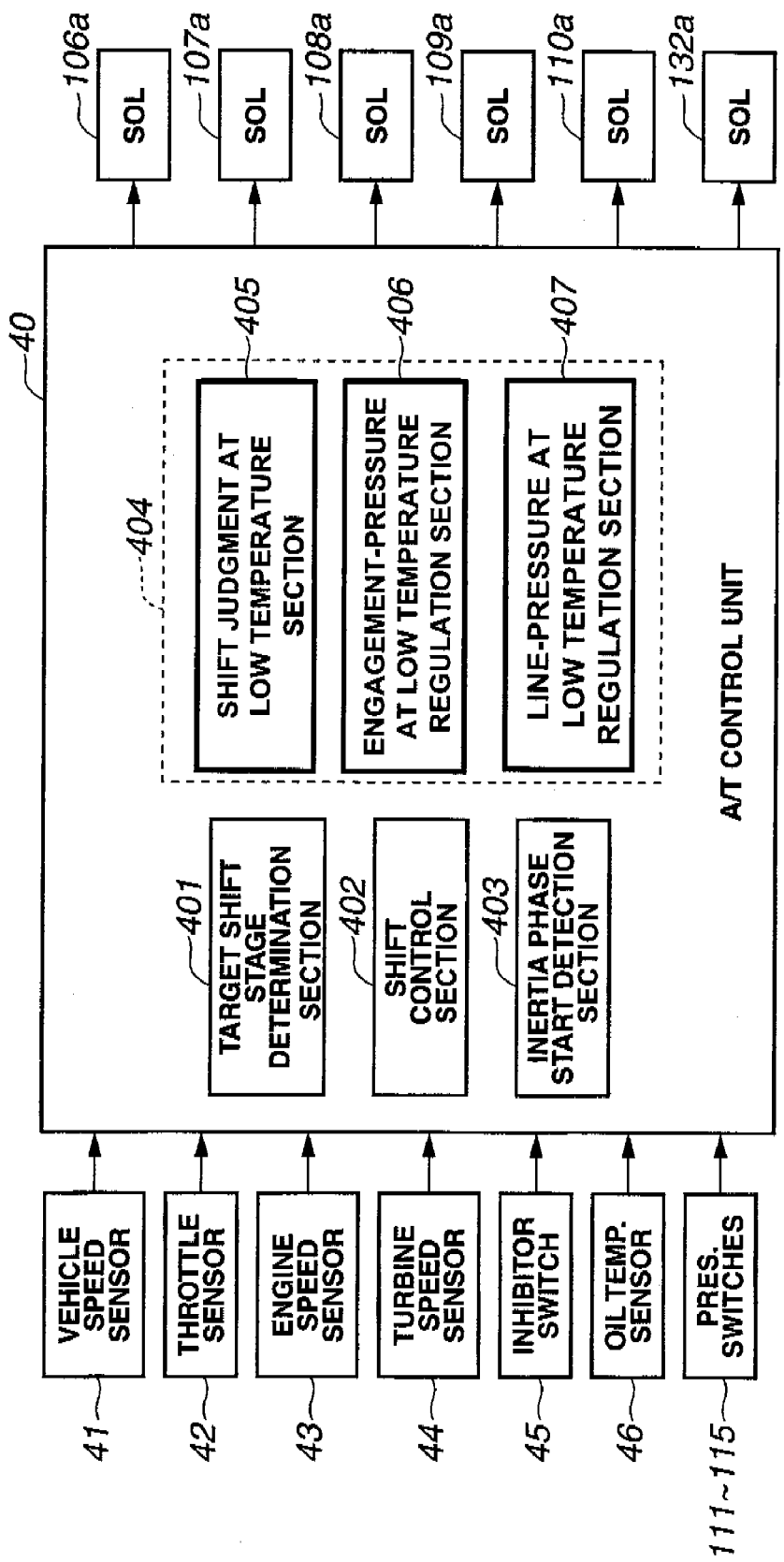
FIG. 9 is a block diagram showing the constitution of functions of a major portion of the automatic transmission control system in accordance with the first embodiment of the present invention.

Next, there is description on shift control. FIG. 9 is a control block diagram showing the constitution of the A/T control unit. As illustrated, connected to an input side of the A/T control unit 4 are various sensors and/or switches 41~46, 111~115, while, connected to an output side of it are various duty solenoids 106a~110a and linear solenoid 132a.

In addition, the A/T control unit 40 includes a target shift stage determination section 401, a shift control section 402, an inertia phase start detection section 403 and a shift at low temperatures control section 404 and etc. These sections perform calculations based on input information from the various sensors 41~46 and the pressure switches 111~115. These sections also output solenoid drive signals to the duty solenoids 106a~110a and the linear solenoid 132a.

Among them, the target shift stage determination section 401 has a function to determine a target shift stage based on vehicle driving information including an accelerator position and a vehicle speed and it is memorized in the A/T control unit 40 as a shift map.

The shift control section 402 starts shifting and carries out shift control. In other words, it gives oil pressure order(s) to the duty solenoids 106a~110a to engage the frictional element(s) which accomplishes a new shift stage after a shift (engagement side frictional element) and oil pressure order(s) to disengage the frictional element(s) which accomplishes the current shift state before the shift (disengagement side frictional element). This shift control section 402 stores control programs (control data) for all shift patterns beforehand, and, using these memorized data, carries out shift control for a shift from the current shift stage by ±1 stage.

In addition, the shift control section 402 gives an oil pressure order to the linear solenoid 132a to pressure regulate the line pressure PL. Setting of an order oil pressure is performed by referring to line pressure maps memorized in the shift control section 402.

Figure 10:
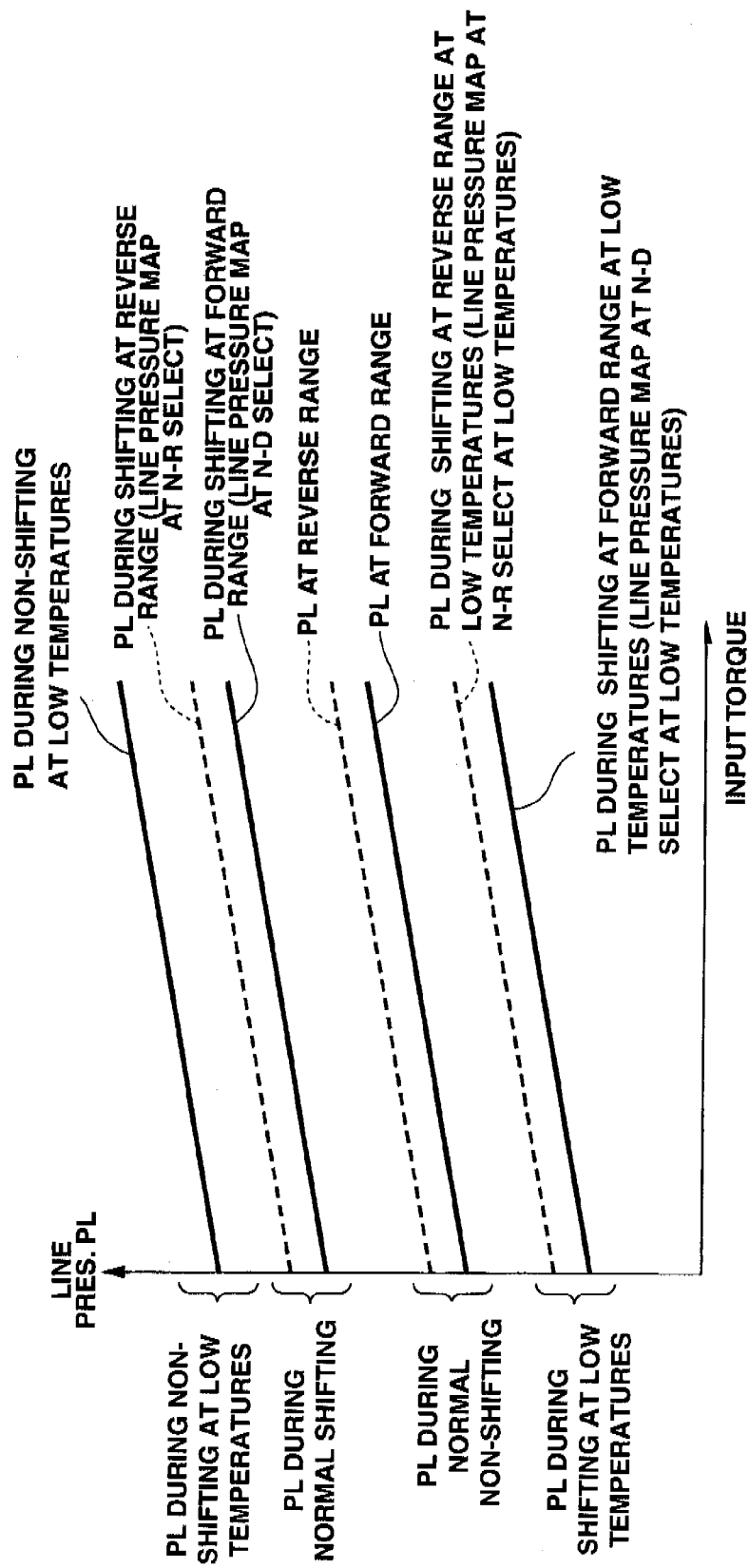
FIG. 10 shows line pressure maps stored in the automatic transmission control system in accordance with the first embodiment of the present invention.

FIG. 10 shows the line pressure maps. The line pressure maps show the most suitable characteristics for input torque and they are set to calculate high line pressure when input torque is big. They make it possible to supply engagement pressure needed for each of the frictional elements and calculate such a line pressure PL that may reduce a loss of the oil pump O/P most.

There are several patterns for the line pressure maps, and there are, as the line pressure maps which are referred to at normal oil temperatures, line pressure maps during normal non-shifting, which maps are referred to during normal non-shifting, and line pressure maps during normal shifting, which maps are referred to during shifting. As the line pressure maps during normal non-shifting, there are a line pressure map at forward range, which map is referred to at forward range, and a line pressure map at reverse range, which map is referred to at reverse range. As the line pressure maps during normal shifting, there are a line pressure map during normal shifting at forward range, which map is referred to during shifting at forward range and a line pressure map during shifting at reverse range, which map is referred to at reverse range.

In addition, there are a line pressure map at N-D select, which map is referred to at a select from a non-drive range to a forward drive range, and a line pressure map at N-R select, which map is referred to at a select from the non-drive range to a reverse drive range. In the first embodiment, the setting is such that the line pressure map during shifting at forward range and the line pressure map at N-D select give the same line pressure against the same input torque, and the line pressure map during shifting at reverse range and the line pressure map at N-R select give the same line pressure against the same input torque. The line pressure maps are not limited in particular so that the setting of these maps may be tailored to performance requirements of different types of vehicles, and the line pressure maps during shifting may be referred to against input torque at select operation instead of providing separate line pressure maps at select operation.

Furthermore, as line pressure maps that are referred to at low temperatures when oil temperature is lower than a predetermined value, there are a line pressure map during non-shifting at low temperatures, which map is referred to during non-shifting at low temperatures, and a line pressure map during shifting at low temperatures, which map is referred to during shifting at low temperatures. As line pressure maps during shifting at low temperatures, there are a line pressure map during shifting at forward range at low temperatures, which map is referred to at forward range and a line pressure map during shifting at reverse range at low temperatures, which map is referred at reverse range.

In addition, there are a line pressure map at N-D select at low temperatures, which map is referred to at a select from a non-drive range to a forward drive range, and a line pressure map at N-R select at low temperatures, which map is referred to at a select from the non-drive range to a reverse drive range. In the first embodiment, the setting is such that the line pressure map during shifting at forward range at low temperatures and the line pressure map at N-D select at low temperatures give the same line pressure against the same input torque, and the line pressure map during shifting at reverse range at low temperatures and the line pressure map at N-R select at low temperatures give the same line pressure against the same input torque. The line pressure maps are not limited in particular so that the setting of these maps can be tailored to performance requirements of different types of vehicles, and the line pressure maps during shifting may be referred to against input torque at select operation instead of providing separate line pressure maps at select operation.

Furthermore, with the same input torque, the line pressure map at non-shifting at low temperatures provides a higher oil pressure than the line pressure map during shifting at low temperatures (at forward range or reverse range) does. In addition, the line pressure map during shifting at low temperatures (at forward range or reverse range) provides a lower oil pressure than the line pressure map during normal shifting (at forward range or reverse range) does. In addition, the line pressure map at select at low temperatures (at N-D or N-R) provides a lower oil pressure than the line pressure map at normal select (at N-D or N-R) does.

During non-shifting at normal temperatures, the shift control section 402 gives an order to the linear solenoid 132a based on input torque and the line pressure map at forward range (or at reverse range) to control the line pressure regulator valve 132. This makes it possible to adjust the line pressure PL, which is the ejection pressure of the oil pump O/P, to an appointed line pressure value PL, thereby reducing a loss of the oil pump O/P most.

During shifting, the shift control section 402 gives an order to the linear solenoid 132a based on input torque during shifting and the line pressure map during shifting at forward range (or at reverse range) to control line pressure regulator valve 132. This makes it possible to adjust the line pressure PL to an appointed line pressure value PL, thereby improving shift feel.

The inertia phase start detection section 403 calculate an actual gear ratio GR and a shifting progress degree SK based on information from the turbine speed (rpm) sensor 44 and the like, and detect or determine a start of inertia phase. In addition, this inertia phase start detection section 403 can detect or determine an end of inertia phase. Therefore, the inertia phase start detection section 403 has a function of inertia phase end detection section, too.

The shift at low temperatures control section 404 has a shift judgment at-low-temperature section 405, an engagement-pressure at-low-temperature regulation section 406, and a line pressure at-low-temperature section 407. The shift judgment at-low-temperature section 405 determines whether or not there is a shift or a select from a non-drive range to a drive range at low temperatures. The engagement-pressure at-low-temperature regulation section 406 gives oil pressure orders to the duty solenoids 106a~110a to selectively engage an engagement side frictional element and/or selectively disengage a disengagement side frictional element during shifting at low or low temperatures. The line pressure at-low-temperature section 407, which includes line pressure maps for low temperatures (see FIG. 10) and gives an oil pressure order to the linear solenoid 132a during shifting at low temperatures or during non-shifting at low temperatures.

Operation of First Embodiment

Next, there is description on the first embodiment of a control system.

There is description on concrete content of the shift control. At normal time, namely, other than the case at low temperatures, the shift control is carried out along the control programs (control data) memorized beforehand in the shift control section 402 to make an n→(n−1) shift if the shift is a downshift or an n→(n+1) shift if the shift is an upshift.

Normal Downshift Control

Figure 11:
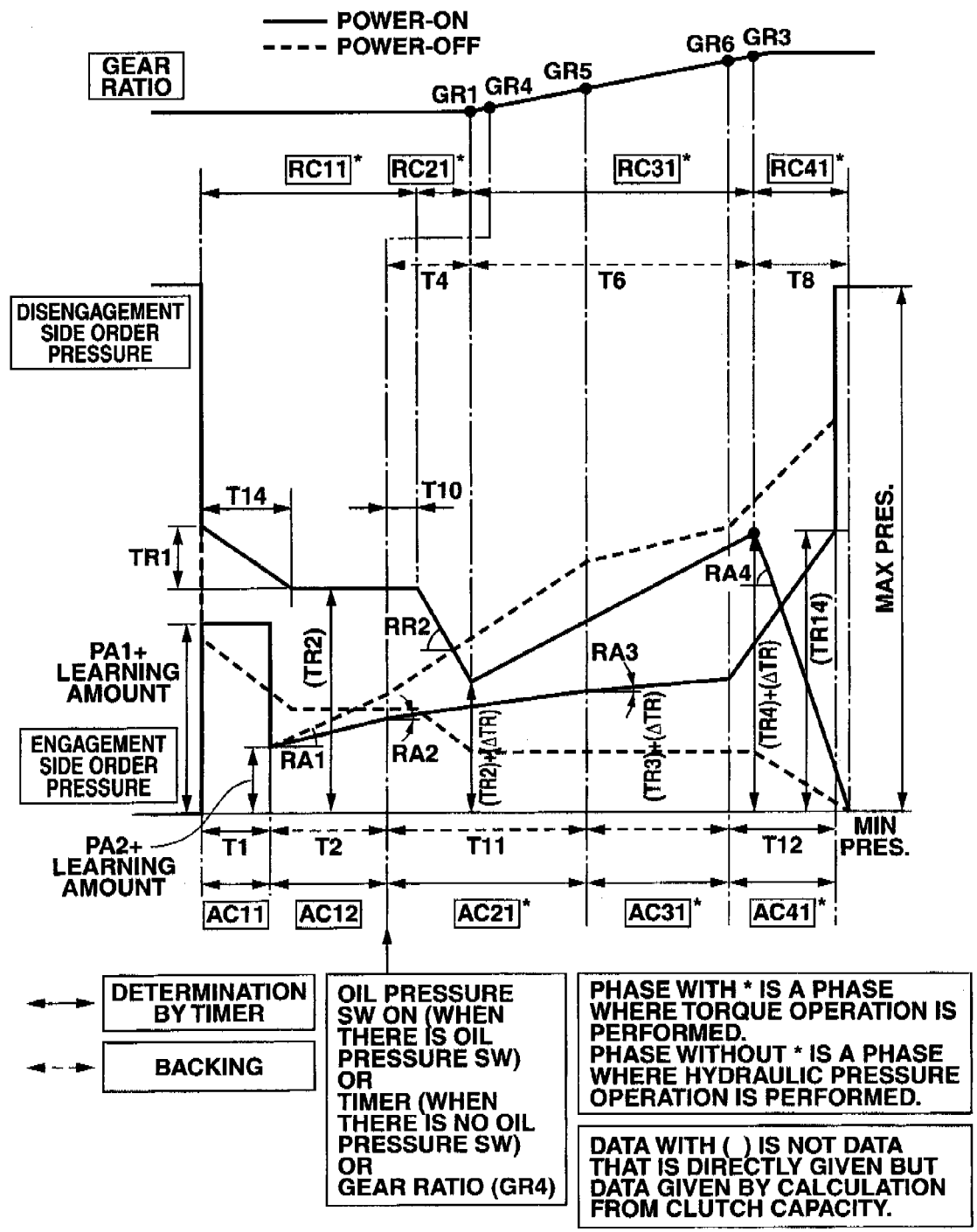
FIG. 11 is a time chart showing the hydraulic characteristic at the time of a normal downshift by the automatic transmission control system in accordance with the first embodiment of the present invention.
Figure 12:
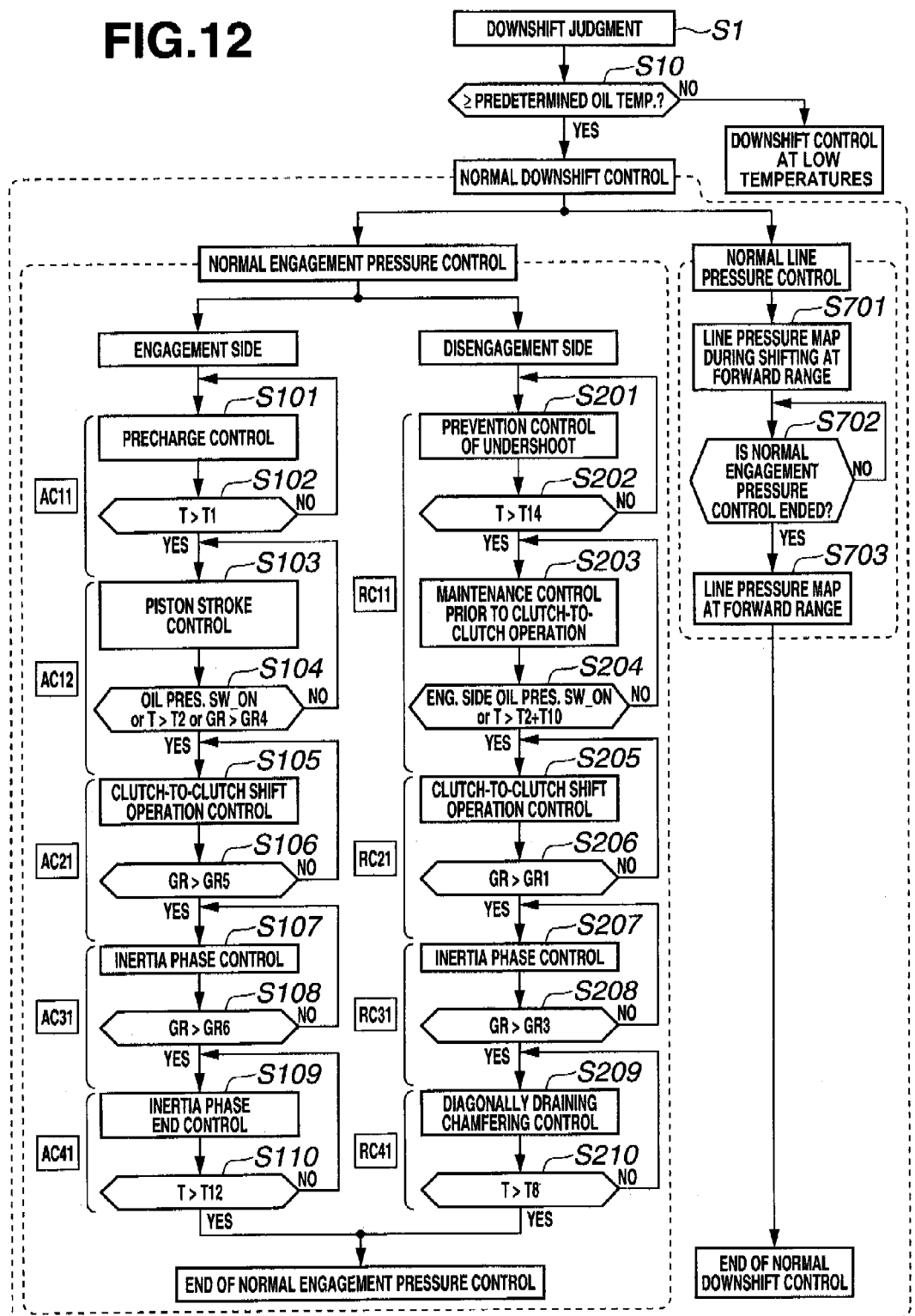
FIG. 12 is a flow chart showing the operation at the time of the normal downshift by the automatic transmission control system in accordance with the first embodiment of the present invention.

At first, referring to FIGS. 11 and 12, there is description on a downshift at normal time other than at low temperatures (normal downshift). FIG. 11 is a time chart of a normal downshift control, and FIG. 12 is its flow chart.

The flow chart shown in FIG. 12 begins with step S1 to carry out a downshift judgment. In other words, when, during a run with the nth shift stage, driving conditions have changed to predetermined conditions, the (n−1)th is set as a target shift stage by a shift map, that is, the target shift stage determination section 401, within the A/T control unit 40.

A normal downshift control from the nth shift stage to the (n−1)th is started based on control signals from the shift control section 402 when, in step S10, the temperature of automatic transmission oil is equal to or higher than a predetermined value. For example, the predetermined value can be set to −20° C., where the automatic transmission oil has an extremely high viscosity.

The normal downshift control comprises a normal engagement pressure control and a normal line pressure control. With the normal engagement pressure control, oil pressures on the engagement and disengagement side (called in the following "engagement pressures") are controlled by the shift control section 402 in order to reduce engagement shock. With the normal line pressure control, the line pressure PL is controlled by the shift control section 402 in order to improve shift feel.

Normal Engagement Pressure Control

The following is description on normal engagement pressure control, that is, the engagement pressure control during a normal downshift.

Precharge Control: Engagement Side

With oil pressure control of an engagement side frictional element, the precharge control (piston stand-by control) is carried out (indicated at AC11 in FIGS. 11 and 12). This control is carried out to let the piston complete a portion of its full stroke as soon as possible and outputs an oil pressure order value to order oil pressure high enough to let the piston stroke around 70% of its full stroke. In addition, the oil pressure order value that is outputted at this time results from adding a learning amount to a preset value PA1 (PA1+learning amount).

And, immediately after outputting the above-mentioned oil pressure order value (the preset value PA1+learning amount) for a predetermined time T1, an oil pressure order value is decreased once to set an oil pressure order value (a preset value PA2+learning amount), which builds up oil pressure value high enough to maintain the above-mentioned piston stand-by state, to prepare for engagement. In addition, the learning is carried out based on time and a rate of change until inertia phase.

Piston Stroke Control: Engagement Side

After elapse of the predetermined time T1, there is a shift to a piston stroke control (as indicated at AC12 in FIG. 11). This piston stroke control increases an oil pressure order value from the above-mentioned oil pressure value (PA2+learning amount) at a predetermined input torque dependent incline RA1 in order to control a piston stroke of a clutch of the engagement side.

In this case, the setting is such that the predetermined incline is the value which keeps oil pressure within a piston chamber of the engagement side frictional element constant, and this value of the predetermined incline is set by considering a rise of actual oil pressure after the piston stroke control and unevenness and the like of the piston stroke (step S103). In addition, in the case of a power-on downshift, the later described disengagement side frictional element lets the shift control make progress, and in the case of a power-off downshift, the engagement side frictional element lets the shift control make progress. On this account, the predetermined incline RA1 in a power-on downshift is gentler than that in a power-off downshift.

And the piston of the engagement side frictional element strokes gradually under the constant pressure value which is determined by such an oil pressure order value, and an oil pressure switch is turned ON when the piston stroke is completed. On this account, the piston stroke control comes to an end upon detecting the oil pressure switch ON, and there is a shift to the next AC21 (step S104). In addition, a timer and the gear ratio GR are monitored as the backing of the oil pressure switch so that, when the oil pressure switch ON is not detected, the piston stroke control is finished upon elapse of a predetermined time T2 beginning with the start of the piston stroke control or upon the gear ratio GR achieving a predetermined gear ratio GR4 that is higher than a gear ratio GR1 indicative of start of inertia phase.

Undershoot Prevention Control: Disengagement Side

On the other hand, in a disengagement side frictional element, at first, an undershoot prevention control is carried out (RC11 in FIGS. 11 and 12). In other words, an oil pressure order value is reduced to a predetermined oil pressure value TR2 that is set depending on an input torque when the downshift is started. Then, in order to prevent excessive drop of oil pressure (undershoot), an oil pressure order value that is slightly higher, by an amount (+TR1), than the oil pressure value which is to be targeted is output at the start of the shift, and then the oil pressure order value is gradually decreased to the above-mentioned oil pressure value TR2 to be targeted by taking a predetermined time T14 (steps S201, S202 of FIG. 12).

In addition, the oil pressure value TR2 mentioned above is equivalent to oil pressure, with which inertia phase starts at the time of a power-on downshift, of the degree that allows plates of the disengagement side frictional element to begin to slip slightly, In addition, it is equivalent to oil pressure of the degree that does not allow clutch plates of the disengagement side frictional element to slip at the time of a power-off downshift.

Maintenance Control Prior to Clutch-to-Clutch Shift Operation: Disengagement Side And, there is a shift to a maintenance control prior to clutch-to-clutch operation upon elapse of a predetermined time T14 (RC11 in FIGS. 11 and 12). This control maintains the current shift stage by the disengagement side frictional element until completion of the piston stroke of the disengagement side frictional element by controlling the engagement pressure within the disengagement side frictional element to the input torque dependent oil pressure TR2 (step S203).

This is because neutral state is established to allow the engine to race to cause an increase in engine rpm if, at the time of a power-on downshift, the disengagement side frictional element is disengaged when the engagement side frictional element is not sufficiently prepared for engagement. In addition, at the time of a power-off downshift, establishing neutral state allows the engine rpm to drop toward an idle rpm, causing an increase in rotational difference between the clutch plates of the engagement side frictional element. In order to avoid such events, the maintenance control prior to clutch-to-clutch shift operation is carried out.

Afterwards, detection that the oil pressure switch is ON (=the completion of piston stroke) or elapse of the time T2+T10 finish the maintenance control prior to clutch-to-clutch shift operation (step S204).

By the way, when the above-mentioned AC11 and AC12 of the engagement side frictional element and RC11 of the disengagement side frictional element are finished, there is an advance to AC21 and RC21 next and a clutch-to-clutch shift operation is started.

Clutch-to-Clutch Shift Operation Control: Disengagement Side

In the disengagement side frictional element, upon completion of the piston stroke (oil pressure switch ON or elapse of T2+T10) at the time of a power-on downshift, the clutch-to-clutch shift operation control decreases oil pressure at the input torque dependent incline RP2 (step S205).

In addition, at the time of a power-off downshift, in many cases, the inertia phase (RC31) is started before the clutch-to-clutch shift operation is stared and there are many cases that the clutch-to-clutch shift operation RC21 fails to take place, but, if the inertia phase is started, this control is carried out as the backing, hastening the start of the inertia phase by decreasing oil pressure at the inline RR2.

And, when the gear ratio GR achieves the gear ratio GR1 indicative of start of inertia phase, there is a shift to an inertia phase control by finishing the clutch-to-clutch shift operation (step S206).

Clutch-to-Clutch Shift Operation Control: Engagement Side

On the other hand, in the engagement side frictional element, the clutch-to-clutch shift operation control increases the oil pressure order value at a predetermined incline RA2 that is set beforehand based on input torque and vehicle speed (step S105).

Here, the incline RA2 at the time of a power-off downshift is set for every input torque and vehicle speed so that a pull incline (a fall incline of output shaft torque) may become the most suitable and it is set to become a big incline when an input torque becomes big. In addition, the incline RA2 at the time of a power-on downshift is set to become the lowest incline because the engagement capacity is not needed if the piston stroke is completed.

And, when the gear ratio GR achieves a predetermined gear ratio GR5, there is a shift to an inertia phase control by finishing the clutch-to-clutch shift operation of the engagement side frictional element (step S106).

Inertia Phase Control: Disengagement Side

In the disengagement side frictional element, in the case of a power-off downshift, when it starts, an inertia phase control (AC31, RC31) decreases the oil pressure order value from an oil pressure at the time of inertia phase detection at a predetermined incline that is determined dependent on input torque and vehicle speed.

In addition, in the case of a power-on downshift, it controls shift progress with oil pressure within the disengagement side frictional element by increasing the oil pressure order value at an incline that is determined depending on input torque and vehicle speed. It delays an output shaft torque fall and a progress of the shift operation by keeping a clutch capacity in particular, making it easy to synchronize the engagement side frictional element in (n−1)th shift stage (step S207).

And, when the gear ratio GR reaches a gear ratio GR3 near a gear ratio for the (n−1)th shift stage, the inertia phase control is completed (step S208).

Inertia Phase Control: Engagement Side

In addition, in the engagement side frictional element, when it starts, the inertia phase control increases the oil pressure at a predetermined incline RA3 that is determined dependent on input torque and vehicle speed.

In addition, at the time of a power-off downshift, the incline RA3 is set to become gentle so that the progress of a shift is gentle from the middle of the inertia phase to the end thereof. At the time of a power-on downshift, the incline RA3 is set to become the lowest incline because the engagement capacity is not needed (step S107).

And, when the gear ratio GR reaches a predetermined gear ratio GR6 that is to be reached before the before-mentioned gear ratio GR3, the inertia phase control is completed (step S108).

Inertia Phase End Control: Engagement Side

Afterwards, there is a shift to an inertia phase end control (AC41) in the engagement side frictional element. This inertia phase end control increases the oil pressure to a predetermined oil pressure TA14 that is set beforehand based on an input torque taking a predetermined time T12 (steps S109, S110). Here, the predetermined oil pressure TA14 is high enough to securely fix the (n−1)th shift stage and can prevent shift shocks occurring due to unevenness upon detection of the end of inertia phase.

And, upon elapse of the predetermined time T12, the inertia phase end control sets 100% as the oil pressure order value (duty), outputting the maximum oil pressure (MAX pressure) to finish shifting operation of the engagement side frictional element.

Diagonally Draining Chamfering Control: Disengagement Side

On the other hand, in the disengagement side frictional element, a diagonally draining chamfering control is carried out when the inertia phase control comes to an end (RC41). The diagonally draining chamfering control decreases the oil pressure at a predetermined incline RR4 that is determined depending on an input shaft upon judgment of the end of inertia phase, quickly decreasing the oil pressure to the minimum oil pressure (zero oil pressure) while suppressing torque variations of the output shaft (step S209).

And, the diagonally draining chamfering control finishes shifting in the disengagement side frictional element by setting 0% as the oil pressure order value (duty) to order the minimum oil pressure (MIN pressure=zero oil pressure) upon elapse of a predetermined time T8 beginning with decreasing the oil pressure in this way at the predetermined incline RR4.

As above, the normal engagement pressure control is carried out by the shift control section 402.

Normal Line Pressure Control

In other words, in a normal downshift line pressure control, a normal line pressure control reduces shift shocks by regulating the line pressure PL that is the original pressure of the engagement pressure supplied to the frictional element.

At the time of normal run free from shifting, the shift control section 402 provides, as an output, an order to the linear solenoid 132$a$ based on line pressure map at forward range (see FIG. 10) to regulate the line pressure regulator valve 132. By this, the line pressure is regulated to the line pressure PL.

As shown in the flow chart of FIG. 12, after the start of the normal downshift, the shift control section 402 changes the line pressure map for the line pressure map during shifting at forward range (see FIG. 10) to control the line pressure regulator valve 132$b$ such that the line pressure PL becomes a predetermined level of line pressure PL lower than the predetermined level of line pressure before the start of the normal downshift (step S701).

Both the line pressure map at forward range and the line pressure map during shifting at forward range are set to calculate predetermined levels of line pressure PL based on input torque. Therefore, before and after the shift event, a change in levels of line pressure PL is small. That is, when input torque is big, the line pressure PL calculated other than shifting and the line pressure PL calculated during shifting are both high. When input torque is small, the line pressure PL calculated other than shifting and the line pressure PL calculated during shifting are both low. Therefore, in any one of the both cases, a change in levels of line pressure PL is small before and after the shift event.

Upon completion of clutch-to-clutch shift operation by finishing engagement pressure control, the shift control section 402 changes the line pressure map for the original line pressure map during non-shifting (line pressure map at forward range) (steps S702 and S703).

As above, the shift control section 402 caries out the normal downshift control.

Normal Upshift Control

Figure 13:
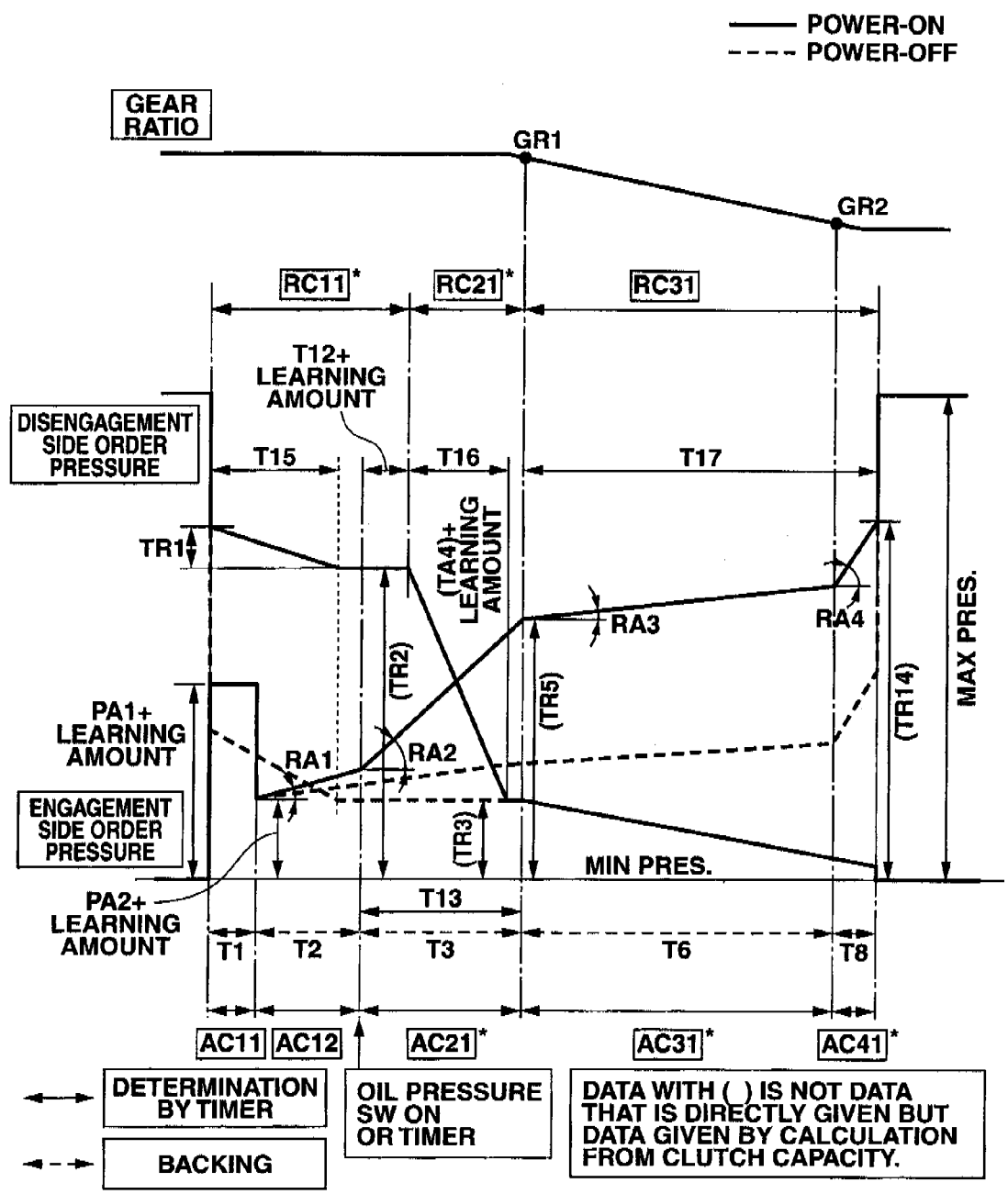
FIG. 13 is a time chart showing the hydraulic pressure characteristic at the time of normal upshift by the automatic transmission control system in accordance with the first embodiment of the present invention.
Figure 14:
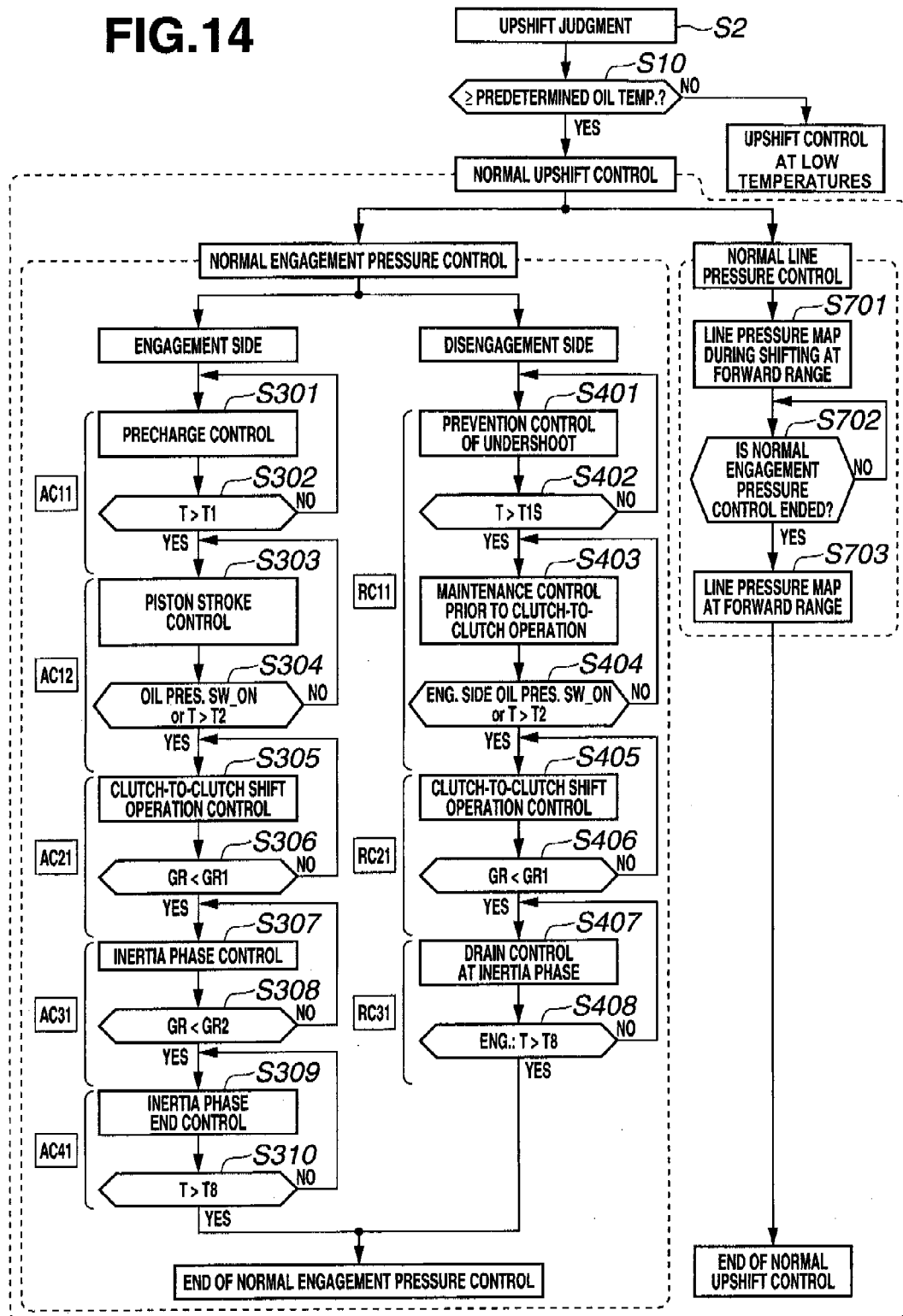
FIG. 14 is a flow chart showing the operation at the time of normal upshift by the automatic transmission control system in accordance with the first embodiment of the present invention.

Referring to FIGS. 13 and 14, there is description on an upshift at normal time other than at low temperatures (normal upshift). FIG. 13 is a time chart of a normal upshift control, and FIG. 14 is its flow chart.

The flow chart shown in FIG. 14 begins with step S1 to carry out an upshift judgment. In other words, when, during a run with the (n−1)th shift stage, driving conditions have changed to predetermined conditions, the nth is set as a target shift stage by the target shift stage determination section 401 within the A/T control unit 40.

A normal downshift control from the nth shift stage to the (n−1)th is started based on control signals from the shift control section 402 when, in step S10, the temperature of automatic transmission oil is equal to or higher than a predetermined value.

With the normal upshift control, the shift control section 402 carries out the normal line pressure control as well as the normal engagement pressure control.

Normal Engagement Pressure Control

The following is description on normal engagement pressure control, that is, the engagement pressure control during a normal upshift.

Precharge Control and Piston Stroke Control: Engagement Side

With oil pressure control of an engagement side frictional element, a precharge control (piston stand-by control) is carried out (AC11, steps S301, S302) at start of upshift operation, and a piston stroke control is carried out (AC12, steps S303, S304). Detailed description of these precharge control and piston stroke control are hereby omitted because their control contents similar to those mentioned in connection with the downshift.

Clutch-to-clutch Shift Operation Control: Engagement Side

Next, a clutch-to-clutch shift operation control of AC21 is started. This clutch-to-clutch shift operation control increases oil pressure order value at a predetermined incline RA2 determined based in input torque and vehicle speed (step S305), and there is a shift to the next inertia phase control (step S306) after finishing the clutch-to-clutch shift operation control when the gear ratio GR becomes smaller than a predetermined gear ratio GR1.

Here, the predetermined incline RA2 is set so that a pull incline (a fall incline of output shaft torque during a torque phase) may become the most suitable and it is set to become a big incline when an input torque becomes big. This oil pressure incline RA2 is aimed also at preventing oil pressure surge and shift shocks when clutch-to-clutch shift operation control is replaced by inertia phase control. There is a case in which inertia phase is detected before clutch-to-clutch shift operation is started and a shift is made to the inertia phase without carrying out the present control.

Inertia Phase Control: Engagement Side

When it is started, an inertia phase control (AC31) increases the oil pressure at a predetermined incline that is determined based on input torque and vehicle speed (step S307). Here, the incline RA3 takes a value smaller than the incline RA2 of the clutch-to-clutch shift operation control, allowing the oil pressure to rise gently and comparatively slowly.

And, when the gear ratio GR reaches an inertia phase end gear ratio GR2, the inertia phase control is completed (step S308).

Inertia Phase End Control: Engagement Side

Next, there is a shift to an inertia phase end control (AC41). This inertia phase end control increases the oil pressure at an incline RA4 (constant) larger than the predetermined incline RA3 taking a predetermined time T8. In addition, the oil pressure is allowed to rise at the predetermined incline RA4 because shift shocks caused by unevenness upon detection of the end of inertia phase may occur if the oil pressure order value is increased at a stretch (steps S309, S310).

And, upon elapse of the predetermined time T8, the inertia phase end control sets 100% as the oil pressure order value (duty), outputting the maximum oil pressure (MAX pressure) to finish the engagement pressure control of the engagement side frictional element.

Undershoot Prevention Control and Maintenance Control prior to Clutch-to-Clutch Shift Operation: Disengagement Side On the other hand, in a disengagement side frictional element, at first, an undershoot prevention control is carried out (steps S401, S402). Later, there is a shift to a maintenance control prior to clutch-to-clutch shift operation. In other words, as shown in FIG. 13, an oil pressure order value is reduced to a predetermined order value TR2 when an upshift is started.

Then, in order to prevent excessive drop of oil pressure (undershoot), the target oil pressure order value is gradually decreased to the above-mentioned oil pressure order value TR2 to be targeted by taking a predetermined time T15. In addition, the above-mentioned oil pressure order value TR2 is the limit value that a clutch of the disengagement side frictional element does not slip.

And, with the oil pressure maintained in such a limit value TR2 by the maintenance control prior to clutch-to-clutch shift operation (RC11), the torque capacity of the clutch drops and shifting starts progressing immediately after a drop in oil pressure when there is a shift to the clutch-to-clutch shift operation. In addition, at the time of a power-off upshift, a constant oil pressure order value TR3 (<TR2) is applied instead of the above-mentioned oil pressure order value TR2.

Clutch-to-clutch Shift Operation Control: Disengagement Side

Next, a clutch-to-clutch shift operation control (RC21) is started. This clutch-to-clutch shift operation control sets an incline of oil pressure order value such that the oil pressure order value may become an oil pressure order value TR3 at the time of the above-mentioned power-off upshift upon elapse of a predetermined time T16, and decreases the oil pressure order value gradually at this incline.

And, the oil pressure order value reaches the oil pressure order value TR3 upon elapse of the predetermined time T16, and there is a shift to a drain control at inertia phase RC31 after the oil pressure order value keeps the value TR3 until the gear ratio GR reaches an inertia the gear ratio GR1. In addition, there is a shift to a drain control at inertia phase (step S406) in time when the gear ratio reaches the inertia phase start gear ratio GR1 before elapse of the predetermined time T16.

Drain Control at Inertia Phase: Disengagement Side

When it is started alter a shift, the drain control at inertia phase control gradually decreases the oil pressure order value at a gentle incline such that it may take a predetermined time T17 for the oil pressure order value to become an oil pressure of 0 (step S407). Here, the reason why this control does not decrease the oil pressure order value to 0 (zero) at a stretch is to avoid outbreak of shocks. In other words, setting a time needed for gear ratio to reach a shifting end gear ratio from an inertia phase start gear ratio GR1 as the predetermined time T17, the control completes shifting operation without shift shocks by gradually decreasing the oil pressure during this predetermined time T17.

And, while decreasing, in this way, the oil pressure, upon elapse of a predetermined time T8 after judgment that the gear ratio reaches a gear ratio GR2, this control completes the shifting operation by setting 0 as the oil pressure order value (step S408).

Normal Line Pressure Control

Line pressure control at a normal upshift is similar to that at a normal downshift. As above, the normal upshift control is carried out by the shift control section 402.

Normal Select Control

Figure 15:
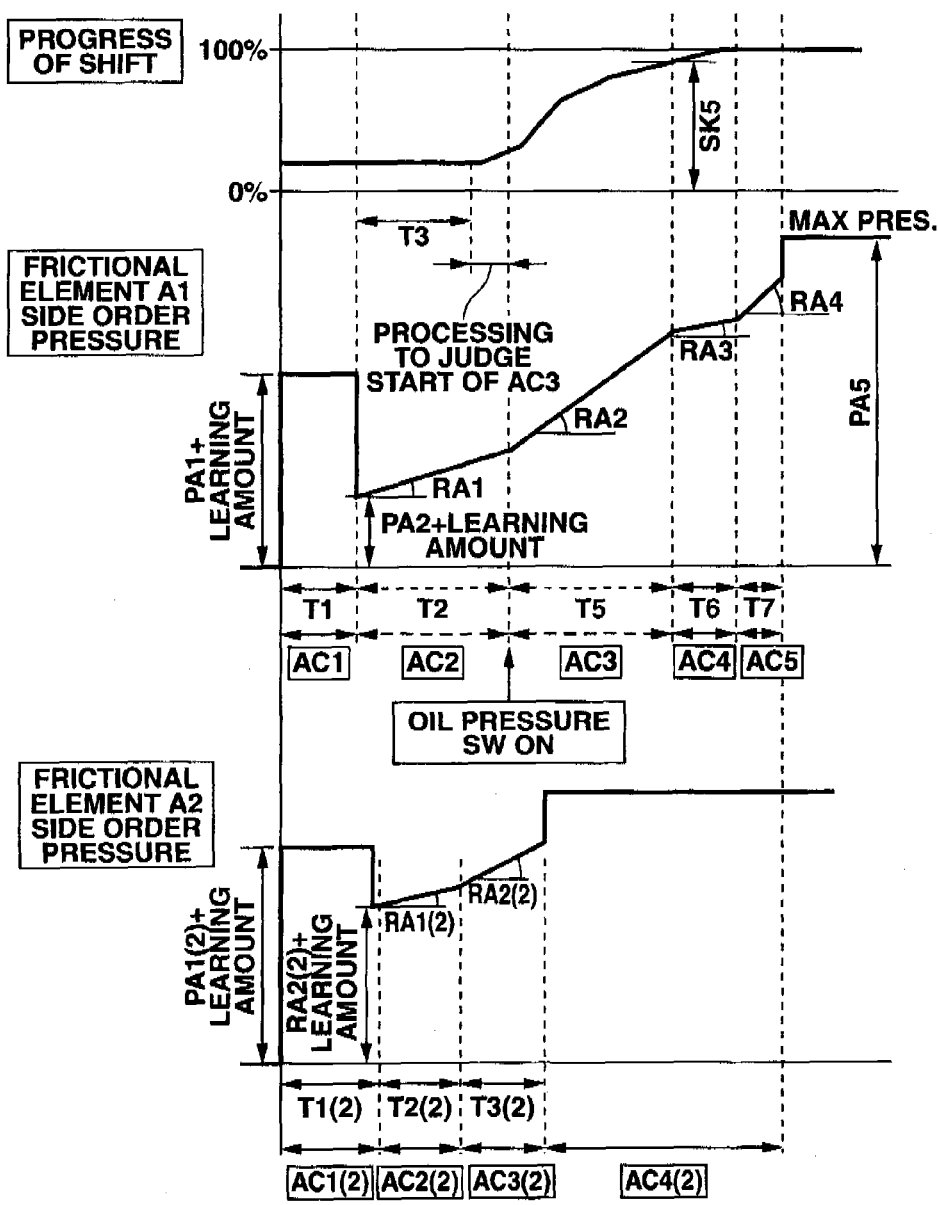
FIG. 15 is a time chart showing the hydraulic pressure characteristic at the time of normal select by the automatic transmission control system in accordance with the first embodiment of the present invention.
Figure 16:
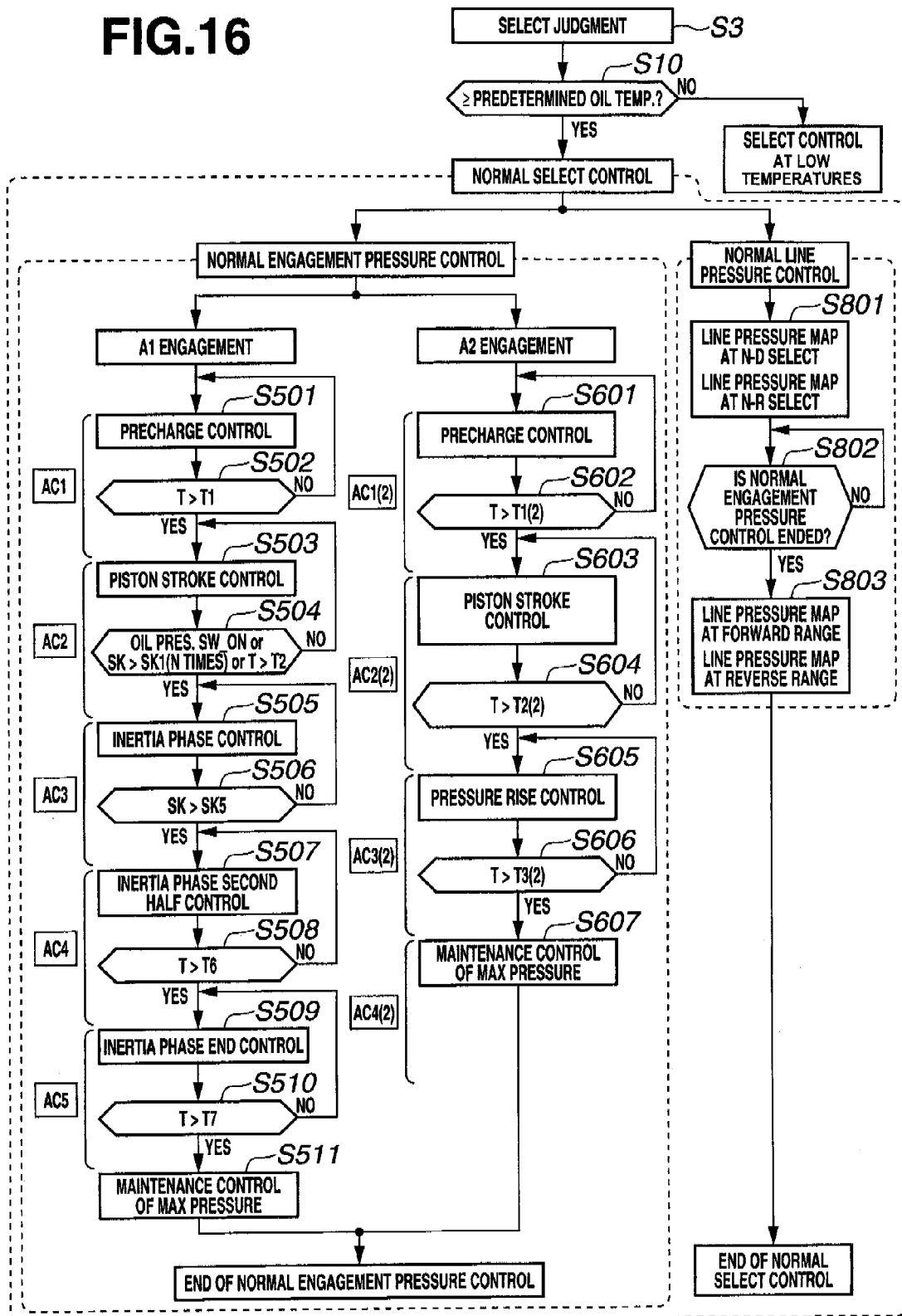
FIG. 16 is a flow chart showing the operation at the time of normal select by the automatic transmission control system in accordance with the first embodiment of the present invention.

Referring to FIGS. 15 and 16, there is description on a select control at normal time other than at low temperatures (normal select control). FIG. 15 is a time chart of a normal select control, and FIG. 16 is its flow chart.

Select Control

The flow chart shown in FIG. 16 begins with step S1 to carry out a select judgment. In other words, when the driver, which is out of the frame, operates a lever to select ranges from N range position to run range (D range or R range) position during operation of the engine, the inhibitor switch 45 detects the selected range position (corresponding to a lever operation detection section). Depending on a kind of the selected range, the shift control section decides which of the frictional elements should be hydraulically controlled as follows:

As shown in FIG. 2, select operation from N range position to D range position is normally achieved by engaging the low clutch LOW/C and the low one-way clutch LOW/OWC. The shift control section 402 controls only the low clutch LOW/C because the low one-way clutch LOW/OWC automatically engages. Although the present invention is not limited to the following in particular, in addition, when installed with select control logic that engage a frictional element via a high shift stage, a frictional element to be engaged according to this logic should be appropriately selected.

Select operation from N range position to engine braking range position (D1 range or M1 range) is achieved by engaging the low clutch LOW/C and the low & reverse brake L&R/B. The shift control section 402 controls both the low clutch LOW/C and the low & reverse brake L&R/B.

Select operation from N range position to R range position is achieved by engaging the 3-5 reverse clutch 3-5R/C and the low & reverse brake L&R/B. The shift control section 402 controls both the 3-5 reverse clutch 3-5R/C and the low & reverse brake L&R/B.

A normal select control is started when, in step S10, the temperature of automatic transmission oil is equal to or higher than a predetermined value after the select judgment (step S3). The normal select control comprises a normal engagement pressure control and a normal line pressure control.

Normal Engagement Pressure Control

The engagement pressure control, at the time of select operation, carries out control of supply oil pressure to a frictional element A1 and/or a frictional element A2. Here, the frictional elements A1 and A2 are engagement side frictional elements (corresponding to a first frictional element). As described later, the oil pressure control for the frictional element A1 (A1 engagement control) carries out inertia phase control to reduce shift shocks, while, the oil pressure control for the frictional element A2 (A2 engagement control) does not carry out inertia phase control, but carries out control causing the engagement pressure to rise quicker than the first frictional element A1. Because a change in revolution of a rotary member within the automatic transmission occurs due to rise in oil pressure established in each of the frictional elements A1 and A2 and the energy due to an inertia change derived from the change in revolution is added as an output shaft torque, it is decided to call an engagement transient state (when progress of shift SK, which is described later, is changing from 0% to 100%) at the time of select operation, in particular, an inertia phase in this embodiment.

The engagement pressure control at the time of select operation determines the timings of start of inertia phase, end thereof and each of control phases in response to the progress of shift SK. The progress of shift SK is an index value based on the quantity of slip within a torque converter and calculated as, $SK=[Ne-(current\ Nt)]/[Ne-(Nt\ at\ end\ of\ select)]$. The progress of shift SK shows progress degree of shifting (select), and it is 0% when current Nt is equal to Ne, and it is 100% at the time of select end. Here, Nt shows transmission input speed (rpm) and Ne shows engine speed (rpm).

When the progress of shift SK is greater than or equal to a predetermined value SKO at the time of select judgment, the shifting progresses under control in open mode by maximizing oil pressure order values for the frictional element A1 and/or frictional element A2 without any control afterwards. The following is description on the case in which the progress of shift SK at the time of select judgment is less than the predetermined value SK0.

First, there is description on A1 engagement control, which is oil pressure control of the frictional element A1 side.

Precharge Control and Piston Stroke Control

In the same manner as the engagement pressure control at normal downshift (upshift), a precharge control (stand-by control) is carried out at start of select (AC1, steps S501, S502), and then a piston stroke control is carried out (AC2, steps S503, S504).

The piston stroke control (AC2) determines that a piston stroke of the frictional element A1 is completed upon detection of oil pressure switch ON. Therefore, the piston stroke control (AC2) comes to an end, and there is a shift to the next inertia phase control (AC3) (step S504).

In addition, a timer and the progress of shift SK are monitored as the backing of the oil pressure switch so that, when the oil pressure switch ON is not detected, the piston stroke control (AC2) is finished and the inertia phase control (AC3) is started (step S504) upon elapse of a predetermined time T2 beginning with the start of the piston stroke control (AC2) or when the progress of shift SK increases by a predetermined value.

Figure 17:
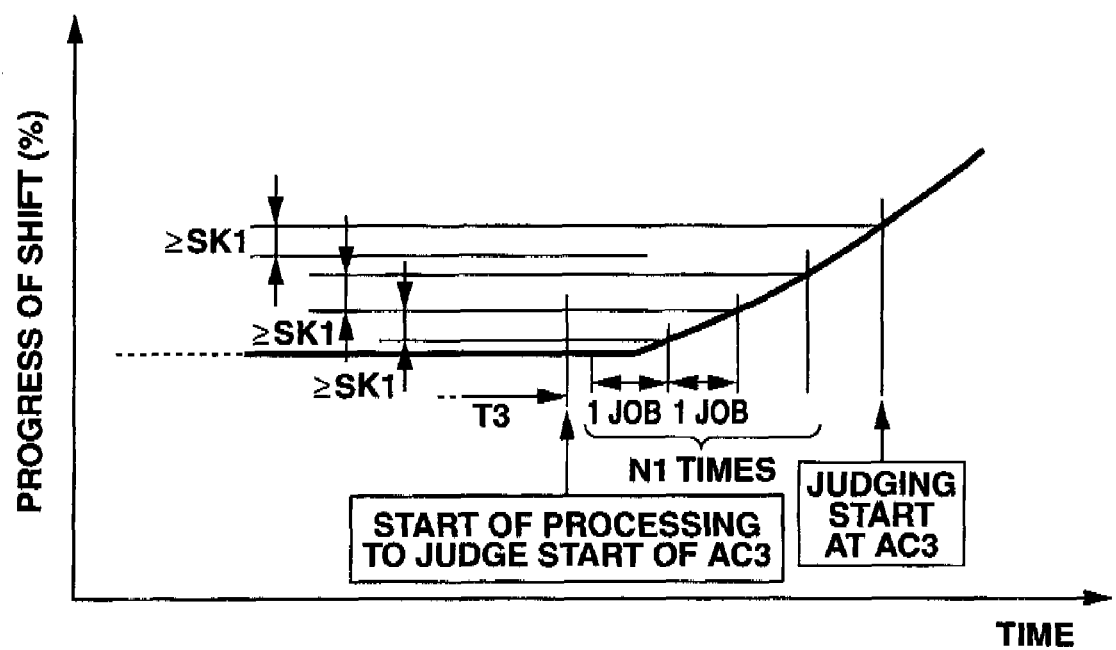
FIG. 17 is a time chart showing the processing steps at the beginning of inertia-phase control at the time of normal select by the automatic transmission control system in accordance with the first embodiment of the present invention.

Based on FIG. 17, there is concrete description on judgment processing to determine start of the inertia phase control (AC3) based on increasing of the degree of shift SK. Judgment on start of AC3 is permitted upon elapse of a predetermined time T3 (<T2) beginning with start of AC2. In this judgment processing, one job calculates ΔSK=(SK by this time job)−(SK by last time job), and this job is repeated multiple times in succession. It is determined that AC3 is to be started when the job that calculated ΔSK bigger than or equal to a predetermined value SK1 occurred a predetermined N times in succession.

Inertia Phase Control

The inertia phase control (AC3) increases an oil pressure order value at a predetermined incline RA2 that is set beforehand based on input torque and vehicle speed (step S505). Here, the predetermined incline RA2 is set so that an incline of the output torque during the inertia phase may become the most suitable and it is set to become a big incline when an input torque becomes big.

When the progress of shift SK becomes greater than a predetermined value SK5, an inertia phase second half control (AC4) is started by finishing the inertia phase control (AC3) (step S506).

Inertia Phase Second Half Control

When it is started, the inertia phase second half control (AC4) increases the oil pressure at a predetermined incline RA3 that is set based on input torque and vehicle speed (step S507). Here, the incline RA3 takes a value smaller than the incline RA2, allowing the oil pressure to rise at a gentle incline and comparatively slowly. And, AC4 is finished upon elapse of a predetermined time T6 (step S508).

Inertia Phase End Control

Next, there is a shift to an inertia phase end control (AC5). This inertia phase end control increases the oil pressure at an incline RA4 (constant) larger than the predetermined incline. RA3 taking a predetermined time T7 (steps S509, S510). The oil pressure is allowed to rise at the predetermined incline RA4 because shift shocks caused by unevenness upon detection of the end of inertia phase may occur if the oil pressure order value is increased at a stretch.

And, upon elapse of the predetermined time T7, the inertia phase end control sets 100% as the oil pressure order value (duty), outputting the maximum oil pressure (MAX pressure) to finish the engagement control of the frictional element A1 (steps S510, S511).

A2 Engagement Control

Next, there is description on A2 engagement control, which is oil pressure control of the frictional element A2 side.

Precharge Control and Piston Stroke Control

In the same manner as the A1 engagement control, a precharge control (stand-by control) is carried out at start of select (AC1(2), steps S601, S602), and then a piston stroke control is carried out (AC2(2), step S603). The piston stroke control AC2(2) increases the oil pressure order value at a predetermined incline, and there is a shift to AC3(2) upon elapse of a predetermined time T2(2) (step S604).

Oil Pressure Rise Control

Oil pressure rise control (AC3(2)) increases the oil pressure order value at a predetermined incline RA2(2) (step S605). Here, the incline RA2(2) takes a larger value than the incline RA2(1) of AC2(2) so that the oil pressure may be increased quickly at a steep incline. The control AC3(2) is finished upon elapse of a predetermined time T3(2).

And, 100% is set as the oil pressure order value (duty), outputting the maximum oil pressure (MAX pressure) (AC4(2), step S607) to finish the engagement control of the frictional element A2.

Normal Line Pressure Control

Line pressure control at normal select is the same as line pressure at normal downshift (upshift). In addition, in N range, line pressure is determined based on the line pressure map during normal non-shifting (line pressure map at forward range), and, at a select from N range to D range (engine braking range), the line pressure map at N-D select as shown in FIG. 10 is used (step S801). On the other hand, at a select from N range to R range, the line pressure map at N-R select as shown in FIG. 10 is used (step S801). After completion of engagement, the line pressure map is changed for the line pressure map during normal non-shifting (line pressure map at forward range or line pressure map at reverse range).

Shift Control at Low Temperatures

In order to prevent shift shocks, the shift at low temperatures control section 404 carries out shift control at low temperatures during a shift, which is meant to include a select, and so on, at low temperatures, in which the fluidity of automatic transmission oil drops.

The shift control at low temperatures comprises an engagement control at low temperatures and a line pressure control at low temperatures. In the engagement pressure control at low temperatures, the engagement pressure at-low-temperature regulation section 406 regulates supply oil pressure to the frictional elements, while, in the line pressure at low temperatures, the line pressure at-low-temperature regulation section 407 regulates line pressure PL.

Downshift Control at Low Temperatures

Figure 18:
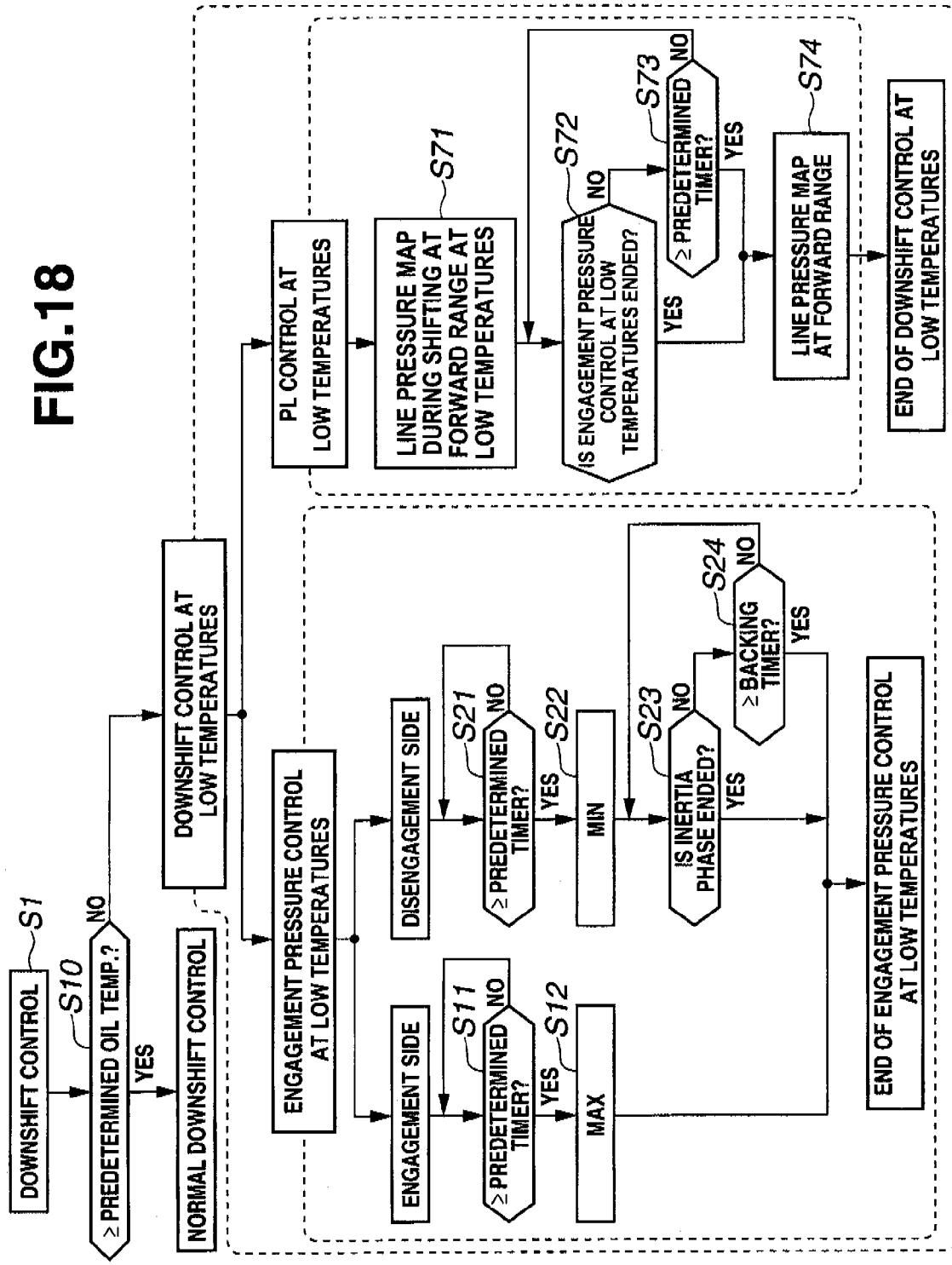
FIG. 18 is a flow chart showing the operation at the time of low temperature downshift the automatic transmission control system in accordance with the first embodiment of the present invention.
Figure 19:
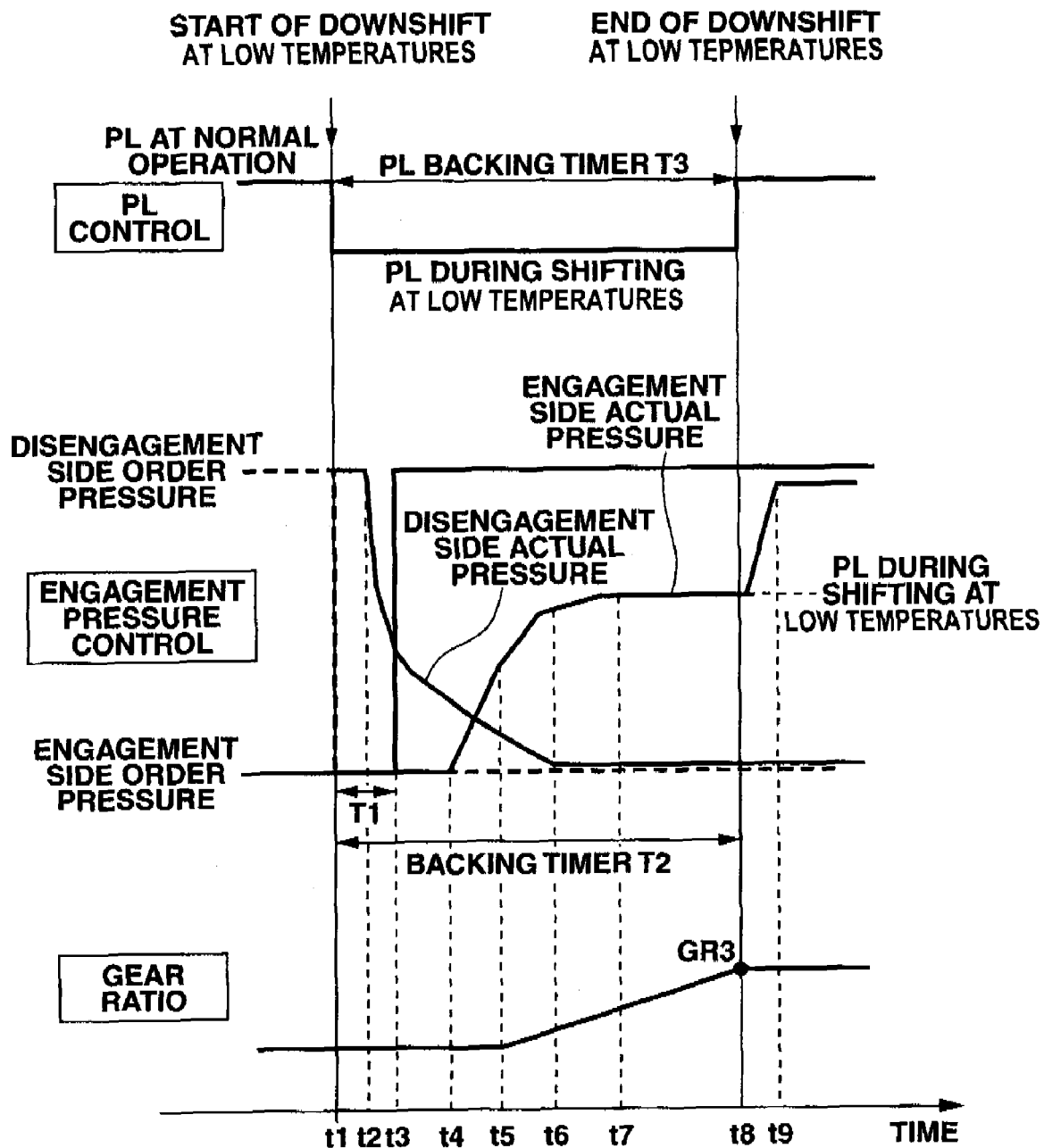
FIG. 19 is a time chart showing the hydraulic pressure characteristic at the time of low temperature downshift by the first embodiment of a control system for an automatic transmission.

Referring to FIGS. 18 and 19, there is description on a downshift at low temperatures. FIG. 18 is a flow chart of the downshift at low temperatures, and FIG. 19 is its time chart.

The flow chart shown in FIG. 18 begins with step S1 in which the target shift stage determination section 401 carries out a downshift judgment based on vehicle speed and throttle opening degree. In step S10, the shift judgment at-low-temperature section 405 determines that the downshift is a downshift at low temperatures when oil temperature detected by the oil temperature sensor 46 is lower than a predetermined value. With the judgment of the downshift at low temperatures, a downshift control at low temperatures, which includes an engagement pressure control at low temperatures and a line pressure control at low temperatures, is performed.

Engagement Pressure Control at Low Temperatures

In the engagement pressure control at low temperatures, the engagement pressure at-low-temperature regulation section 406 outputs an oil pressure order to one of the oil pressure regulator valves 106~110 for the frictional elements to regulate engagement pressure to the frictional element.

Engagement Side Engagement Pressure Control

An engagement pressure control for an engagement side frictional element starts counting of a timer concurrently with the downshift judgment, and, maximizes the oil pressure order for one of duty solenoids 106a~110a upon elapse of a predetermined timer T1 (steps S11, S12). In addition, in the first embodiment, a downshift start occurs at a moment when a shift judgment occurs and it is this moment when a disengagement side engagement pressure control to be described later minimizes an oil pressure order.

The engagement pressure on the engagement side needs to rise to an oil pressure high enough to finish an inertia phase by the end of the inertia phase. Therefore, putting an output timing of an oil pressure order for the engagement side on hold for the predetermined time T1 beginning with a downshift start prevents outbreak of interlock due to a delay in draining oil pressure on the disengagement side. Therefore, the predetermined timer T1 is set based on oil temperature (corresponding to a second period).

The term "interlock" is herein used refers to a state in which all of the rotary members are forced in directions decreasing their revolutions toward zero because both a frictional element to be engaged and a frictional element to be disengaged possess torque capacity. Outbreak of such an interlock at downshift increases depth of an output torque drop (pull feel), causing shift shocks to occur. The outbreak of such shift shocks is prevented by providing the predetermined timer T1.

Disengagement Side Engagement Pressure Control

On the other hand, the engagement pressure control for a disengagement side frictional element minimizes an oil pressure order for engagement to another of the duty solenoids 106a~110a immediately after the downshift judgment (step S22). This prevents a drain delay in oil pressure on the disengagement side. Afterwards, the minimized oil pressure order for engagement is maintained.

As mentioned above, in order to prevent interlock due to a drain delay in oil pressure on the disengagement side, the output timing of an oil pressure order on the engagement side is delayed by installing the predetermined timer T1 in the control on the engagement side. However, the output timing of an oil pressure order on the disengagement side is delayed by installing the control on the disengagement side with varying predetermined timers with different shifts because there is the case that a drain in oil pressure on the disengagement side may become earlier depending on different combinations of frictional elements selected as objects to be controlled (step S21). The above-mentioned predetermined timers are set depending oil temperature. In addition, in this case, 0 (zero) is set as the predetermined timer T1 in the control on the engagement side.

It is determined that an inertia phase is ended (step S23) when the gear ratio GR becomes greater than a gear ratio GR3 after minimizing the oil pressure order on the disengagement side (step S22). This ends the engagement side engagement pressure control. In addition, a backing timer T2 is monitored as the backing of the inertia phase end judgment by gear ratio so that, when the gear ratio does not meet the relationship GR>GR3, the engagement pressure control is finished upon elapse of the predetermined time T2 beginning with the downshift start (step S24).

Line Pressure at Low Temperatures

Keeping the engagement order for the engagement side frictional element maximized until the end of shift is found to be effective in getting rid of a drop in response in engagement pressure of the engagement side frictional element at low temperatures, uneven time until start of engagement and oil pressure variations, but it leaves the regulator valves 106b~110b fully open. In this case, high line pressure is abruptly supplied, as a supply pressure, to the engagement side frictional element and giving fear that shift shocks grow big. This explains why there is a need for performing the following line pressure control at low temperatures.

In the line pressure control at low temperatures, at the time of run free from shifting at low temperatures, the shift at-low-temperature control section 404 provides, as an output, an order to the linear solenoid 132a based on input torque and line pressure map during non-shifting at low temperatures (see FIG. 10) to regulate the line pressure regulator valve 132. By this, the line pressure is regulated to a predetermined line pressure PL (line pressure during non-shifting at low temperatures).

When it determines that there is a downshift at low temperatures, the shift at low temperatures control section 404 changes the line pressure map during non-shifting at low temperatures for the line pressure map during shifting at forward range at low temperatures (see FIG. 10) to start line pressure control thereby to start shifting (step S71). With the same input torque, the line pressure map during shifting at forward range at low temperatures is set lower than the line pressure map during non-shifting at low temperatures and the line pressure maps during normal non-shifting. It is necessary to always maintain the pilot pressure, which is the original pressure of solenoids, in a stable state by setting the line pressure rather high at the time of shifting at normal oil temperatures in which hydraulic precision is required because the duty solenoids 106a~110a and linear solenoid 132a, which control pressure regulator valves, are heavily dependent on the original pressure (the outputted solenoid pressures fluctuate depending on changes of the pilot pressure that is the original pressure). On the other hand, it is not necessary to let the duty solenoids 106a~110a control the pressure regulator valves with good precision, so that, with the same input torque, the line pressure at low temperatures is set lower than the line pressure map during normal shifting.

It is preferable that the predetermined line pressure that is calculated from the line pressure map during shifting at low temperatures (line pressure at low temperatures) is equal to the lower limit of the engagement side engagement pressure needed to finish an inertia phase, but it is set slightly higher than the above-mentioned lower limit. This setting results from considering low response characteristics of line pressure at low temperature and difficulty to regulate oil pressure closely in accordance with an order, and the line pressure at low temperatures is set at an oil pressure that is given by multiplying the lower limit value of the engagement side engagement pressure needed to finish the inertia phase with a safety factor (=1.2 for example).

In addition, response characteristic of line pressure drops in the same manner as the engagement pressure, but it is guaranteed that the line pressure PL drops to the above-mentioned set oil pressure before the engagement side engagement pressure rises to a pressure level in the neighborhood of the line pressure PL because the line pressure PL is regulated immediately after the downshift start (step S71).

The line pressure control is ended by changing the line pressure map during shifting at low temperatures for the line pressure map during non-shifting at low temperatures (line pressure map during non-shifting at forward range at low temperatures) when the engagement pressure control at low temperatures for the frictional element is ended (steps S72, S74). In addition, a backing timer T3 is monitored as the backing of the line pressure control end judgment based on the engagement pressure control end judgment so that the line pressure control is ended upon elapse of a predetermined time T3 beginning with the downshift start (steps S73, S74).

As shown in FIG. 19, at time t1, simultaneously with a downshift judgment at low temperatures, an oil pressure order for a disengagement side frictional element is minimized (an order for complete disengagement), and a shift is started. Because the disengagement order for the disengagement side is outputted simultaneously with the shift start, a delay in draining oil pressure from the disengagement side frictional element is prevented, facilitating progress of shift at low temperatures.

In addition, at time t1, the line pressure PL is decreased to the oil pressure which is set high enough to end an inertia phase. Afterwards, this oil pressure is maintained until the end of downshift at low temperatures.

At t2 upon elapse of a predetermined time from t1 when the downshift starts, actual oil pressure (called hereinafter "engagement pressure") on the disengagement side starts actually dropping.

At t3 upon elapse of a predetermined timer T1 beginning with t1 when the downshift starts, an oil pressure order for an engagement side frictional element is maximized (an order for complete engagement). Afterwards, the maximized oil pressure order continues. At t4 upon elapse of a predetermined time from t3, engagement pressure on the engagement side starts rising actually.

When the maximized oil pressure order is issued at t3, the opening degree of an original port of the pressure regulator valve 106*b*~110*b* is the largest. This is because the oil pressure high enough to end the inertia phase is lower than the maximum of engagement pressure of the pressure regulator valve 106*b*~110*b*, and the opening degree of the original pressure port is the largest regardless of the relation between the maximum of the engagement pressure of the pressure regulator valve 106*b*~110*b* and the maximum of the line pressure PL. On this account, the drop of response characteristic of the engagement pressure on the engagement side is decreased even if the fluidity of working fluid drops at low temperatures. That is to say, the time from the oil pressure order t3 to the oil pressure rise t4 is sufficiently short so that the outbreak of shift shocks due to delay in response of engagement side engagement pressure may be avoided.

The unevenness of time from the oil pressure order t3 to the oil pressure rise t4 is reduced because the maximum oil pressure is ordered in succession at t3 and afterwards.

At t3 upon a delay of a predetermined period T1 that is based on oil temperature from t1, an oil pressure order for the engagement side is issued. On this account, the outbreak of interlock is prevented because the situation in which the disengagement side frictional element still have torque capacity when the torque capacity of the engagement side frictional element is growing will not happen even if time from t1 to t2 becomes long due to response delay of the disengagement side engagement pressure.

At t5 upon elapse of a predetermined time from engagement side engagement pressure rise t4, the disengagement side frictional element starts slipping, and gear ratio GR starts increasing. In other words, inertia phase starts at t5.

At t6 upon elapse of a predetermined time from t2 when the disengagement side engagement pressure starts dropping, the disengagement side engagement pressure becomes zero, completing disengagement of the disengagement side frictional element. In addition, at t6, the engagement side engagement pressure rises to the neighborhood of the line pressure PL. Because the original pressure port of the pressure regulator valve 106*b*~110*b* of the engagement side frictional element is opened to the largest opening degree, the ceiling of the engagement side engagement pressure is the line pressure PL that is the original pressure.

At t7, the engagement side engagement pressure becomes as high as the line pressure PL. On the other hand, the line pressure PL is reduced to the line pressure during shifting at low temperatures from t1 in succession. Therefore, the ceiling of the engagement side engagement pressure is the line pressure during shifting at low temperatures. Here, the line pressure during shifting at low temperatures is set as high as an oil pressure that is high enough to end the inertia phase so that the engagement side engagement pressure may rise high enough to end the inertia phase.

There is a reduction in speed at which torque capacity of the engagement side frictional element increases owing to the lowered ceiling of the engagement side engagement pressure, causing a reduction in rise in engine rpm. Therefore, the outbreak of shift shocks (excessive engine braking feel due to a reduction in output torque) is prevented because the quantity of a reduction in output torque per a unit time becomes small.

At t8, the gear ratio GR becomes equal to a gear ratio GR3 after the downshift, ending the inertia phase. By this, the engagement pressure control is ended, and the line pressure during shifting at low temperatures is changed for the normal line pressure to calculate the line pressure PL. The engagement side engagement pressure starts rising because the ceiling of the engagement side engagement pressure rises with a rise of line pressure PL.

At t9 upon elapse of a predetermined time from t8, the engagement side engagement pressure rises to the neighborhood of the normal line pressure to secure engagement of the engagement side frictional element.

Oil Pressure Vibrations of Pressure Regulator Valve for Frictional Element

The pressure regulator valves 106*b*~110*b* are subject to great changes in movement of a valve spool within a very short period of time or oil pressure vibrations during controlling the pressure regulation of engagement pressure to the frictional element at low temperatures in the same way as at normal temperatures to materialize a supply of precharge pressure (high pressure state) from oil pressure zero (low pressure state), a supply of maintenance oil pressure (low pressure state), and a supply of oil pressure for progress of inertia phase. And, in an low temperature state when the response characteristic of oil pressure drops, there is apprehension that such oil pressure vibrations might be out of control once they occur.

As shown in FIGS. 4 and 5, the pressure regulator valve 106*b*~110*b* for engagement pressure controls a ratio between an inflow of oil and an outflow of oil via two kinds of states, viz., a communication state between a drain port and an output port and a communication state between an original pressure port and the output port, without allowing any concurrent communication between the drain port and the original pressure port. In other words, the engagement pressure which is dependent on a solenoid pressure is regulated when a valve spool stays in an equilibrium position at which the inflow of oil to and the outflow of oil from the pressure regulator valve 106*b*~110*b* are balanced with each other.

Therefore, controlling pressure regulation by subjecting the valve spool to great changes in movement within a very short period of time, as mentioned before, will cause oil vibrations to occur. And, the outbreak of such oil vibrations cannot be controlled at low temperatures when the response characteristic of oil pressure drops because, in the pressure regulator valve 106*b*~110*b* of the type which regulates engagement pressure by controlling a ratio between the inflow to the valve and the outflow from the valve, it is hardly possible to control the quantity of the above-mentioned two flows once such oil vibrations occur.

Therefore, as mentioned above, the first embodiment maximizes the opening degree of an original pressure port of the pressure regulator valve 106b~110b for the engagement side frictional element by performing a maximum pressure order for the pressure regulator valve 106b~110b. In addition, the opening degree of the original pressure port continues to be the largest because the maximum pressure order for the pressure regulator valve 106b~110b in succession for a constant period of time. Therefore, the oil pressure vibrations will not occur because the pressure regulator valve 106b~110b is kept out of operation for the constant period of time. As a result, the situation that oil pressure vibrations occur and become uncontrollable at low temperatures is prevented.

Oil Pressure Vibrations of Line Pressure Regulator Valve

In addition, for the following reasons, outbreak of oil pressure vibrations by the line pressure regulator valve 132b is prevented, too. As shown in FIGS. 6~8, the line pressure regulator valve 132b has the structure that the drain port (the first drain port, the second drain port) and the original pressure port (the line pressure port) are simultaneously communicable with each other, and determines the amount of pressure reduction in the original pressure by the degree of opening, i.e., the amount of drain. It regulates the line pressure PL by carrying out proportional control of the linear solenoid to control the amount of movement of the valve spool thereby to control only the amount of an outflow from the valve (one quantity of oil). In other words, in the range where the oil pump discharge is enough, the line pressure regulator valve 132b is in a state shown in FIG. 7 by always draining oil basically, and always, so to speak, in a pressure equilibrium state.

Therefore, the line pressure regulator valve 132b does not need to control anything but one quantity as compared to the pressure regulator valves 106b~110b for frictional elements when an order is issued for the valve to lower the pressure to a lower limit pressure capable of finishing an inertia phase during shifting because it is of the type capable of adjusting the pressure by controlling only the quantity of outflow from the line pressure port to the drain port. Besides, as mentioned above, the line pressure regulator valve 132b is always in a pressure equilibrium state. Because of this, there is no apprehension that oil pressure vibrations may occur by the line pressure regulator valve 132b.

Furthermore, the oil pressure vibrations are prevented from occurring because a constant oil pressure order for the line pressure regulator valve 132b is issued for a predetermined period in succession during shifting and the period for which the constant oil pressure order is issued is long.

Upshift Control at Low Temperatures

Figure 20:
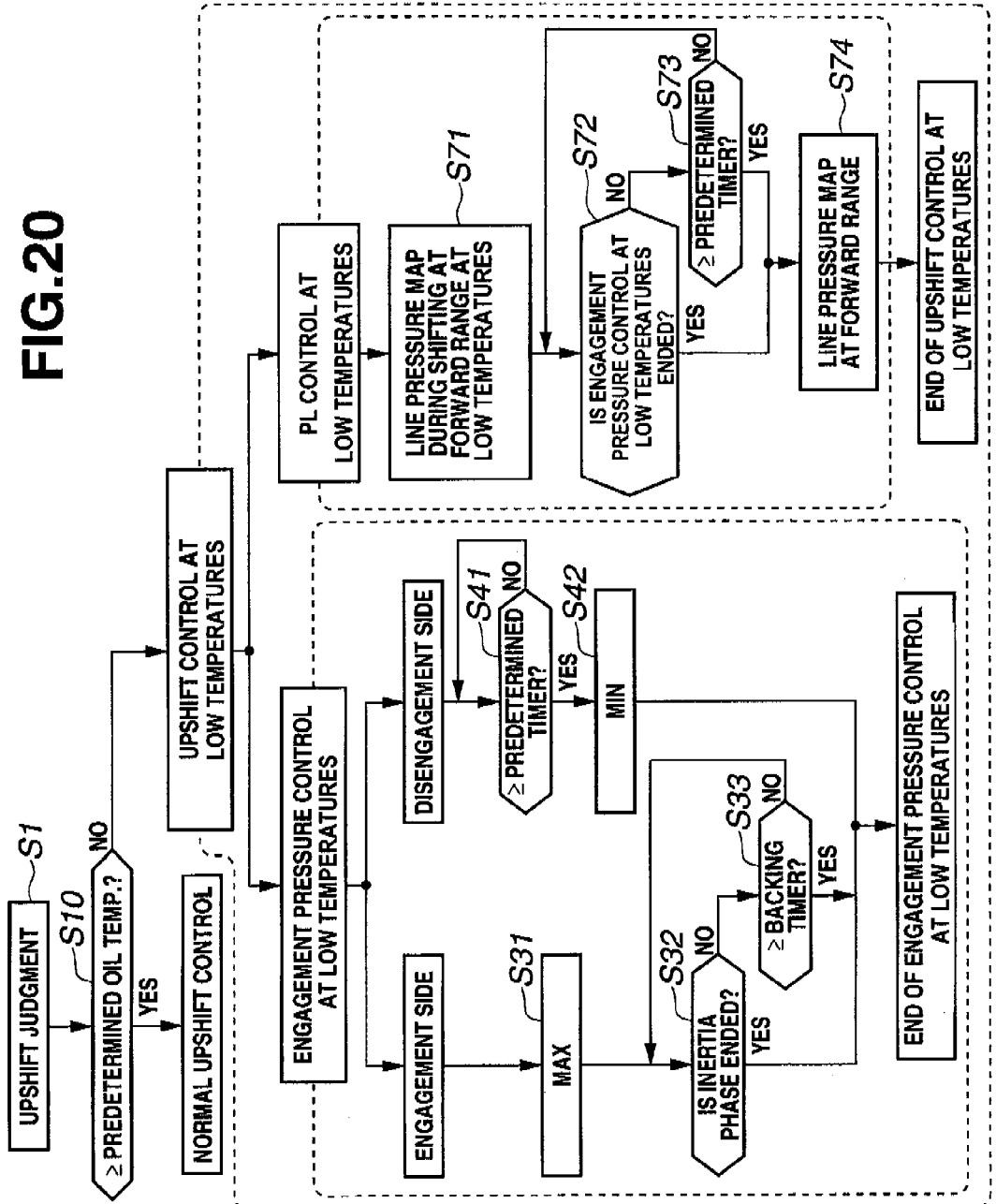
FIG. 20 is a flow chart showing the operation at the time of low temperature upshift the automatic transmission control system in accordance with the first embodiment of the present invention.
Figure 21:
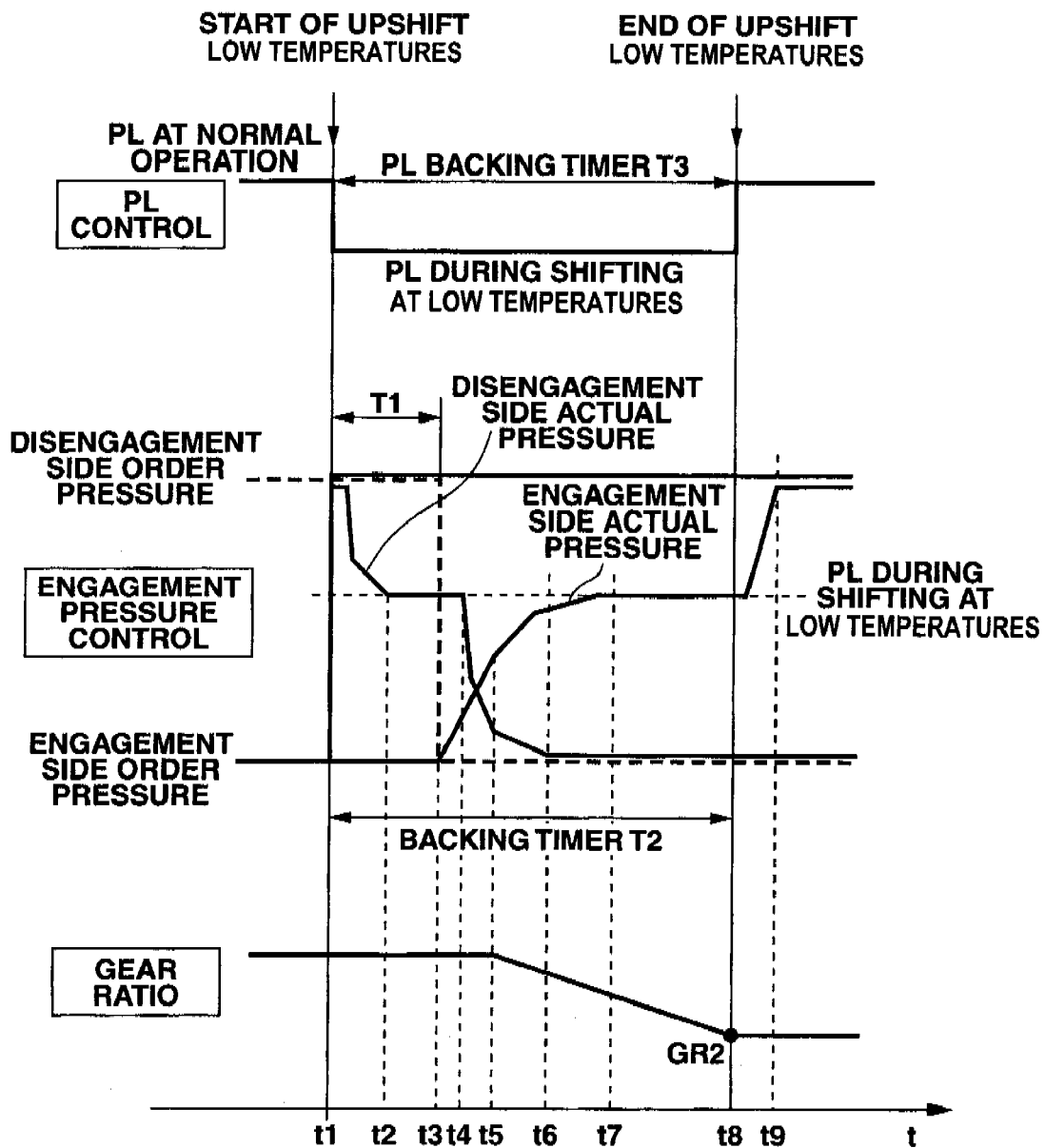
FIG. 21 is a time chart showing the hydraulic pressure characteristic at the time of low upshift the automatic transmission control system in accordance with the first embodiment of the present invention.

Referring to FIGS. 20 and 21, there is description on an upshift control at low temperatures. FIG. 20 is a flow chart of the downshift at low temperatures, and FIG. 21 is its time chart.

As shown in FIG. 20, the target shift stage determination section 401 carries out an upshift judgment (step S1). The shift judgment at-low-temperature section 405 determines that the upshift is an upshift at low temperatures when oil temperature detected by the oil temperature sensor 46 is lower than a predetermined value (step S10). With the judgment of the upshift at low temperatures, in the same manner as the downshift control at low temperatures, an upshift control at low temperatures, which includes an engagement pressure control at low temperatures and a line pressure control at low temperatures, is performed.

Engagement Pressure Control at Low Temperatures

With the engagement pressure control on the engagement side, immediately after start of the shift, an oil pressure order for engagement is maximized (step S31). This shortens an oil pressure rise time on the engagement side. Afterwards, the maximized oil pressure order continues to be issued in succession. By this, oil pressure vibrations will not occur in the pressure regulator valve 106b~110b, leading to prevention of the situation that such oil pressure vibrations become out of control. In addition, in the first embodiment, an upshift start is the moment upon making an upshift judgment as well as the moment upon maximizing an oil pressure order in the engagement pressure control on the engagement side at low temperatures carried out simultaneously with this judgment.

Engagement side engagement pressure control is ended when it is determined that the gear ratio GR becomes equal to or smaller than GR2 (step S32) after the output of an engagement order. In addition, a backing timer T2 is monitored as the backing of the inertia phase end judgment by gear ratio so that, when the gear ratio does not meet the relationship GR≦GR2, the inertia phase is ended upon elapse of the predetermined time T2 beginning with the downshift start (step S33).

With the engagement pressure control on the disengagement side, upon elapse of a predetermined timer T1, which is different from the predetermined timer T1 used in the downshift control at low temperatures, and so on, (corresponding to a first period, an oil pressure order is minimized, and the control is ended with the minimized oil pressure order kept in succession (steps S41, S42). Actual oil pressure rise of the engagement side is waited for by putting an output timing of a disengagement order for the predetermined timer T1. This prevents engine race due to a delay in response characteristic of the engagement side engagement pressure. Therefore, the predetermined timer T1 is set based on oil temperature.

Line pressure control in the upshift control at low temperatures is the same as the line pressure control in the downshift control at low temperatures.

As shown in FIG. 21, at time t1, simultaneously with an upshift judgment at low temperatures, an oil pressure order for an engagement side frictional element is maximized. Because the engagement order for the engagement side is outputted simultaneously with the shift start, a delay in oil pressure rise on the engagement side is prevented, facilitating progress of shift at low temperatures.

In addition, at time t1 (at an upshift start), the line pressure PL is decreased to the oil pressure during shifting at low temperatures, and, afterwards, this oil pressure is maintained until the end of upshift at low temperatures.

At t1 when the upshift starts, the oil pressure order for the disengagement side is maximized and the engagement pressure on the disengagement side is equal to the line pressure PL. As a result from lowering the line pressure PL to the line pressure during shifting at low temperatures, the engagement pressure on the disengagement side starts actually dropping upon elapse of a predetermined time from t1, and, at t2, the engagement pressure on the disengagement side becomes equal to the line pressure at low temperatures. Afterwards, the line pressure during shifting at low temperatures is maintained.

At t3 upon elapse of a predetermined time from t1 when the engagement order on the engagement side is issued, the engagement pressure on the engagement side actually starts rising.

At t3 upon elapse of a predetermined timer T1 beginning with t1 when the upshift starts, the oil pressure order for the engagement side frictional element is minimized, ordering a complete disengagement of the disengagement side. Afterwards, the minimized oil pressure order continues. At t4 upon elapse of a predetermined time from t3, engagement pressure on the disengagement side starts dropping actually.

Because of the maximized oil pressure order issued at time t1 when the upshift starts, the opening degree of an original port of the pressure regulator valve 106b~110b is the largest. On this account, a drop in the response characteristics of the engagement pressure of the engagement side frictional element is restrained even if the fluidity of working fluid drops at low temperatures. That is to say, the time from the oil pressure order t3 to the oil pressure rise t4 is sufficiently short so that the outbreak of shift shocks due to delay in response of engagement side engagement pressure may be avoided.

The unevenness of time from the oil pressure order t1 to t3 when the oil pressure rises actually is reduced because the maximum oil pressure is ordered in succession at time t1 and afterwards.

At t3 upon a delay of a predetermined period T1 that is based on oil temperature from t1, an oil pressure order for the disengagement side is issued. On this account, the outbreak of engine race is prevented because the situation in which the disengagement side frictional element is disengaged when the torque capacity of the engagement side frictional element does not appear will not happen even if time from t1 to t3 becomes long due to response delay of the engagement side engagement pressure.

At t5 upon elapse of a predetermined time from disengagement side engagement pressure drop t4, the disengagement side frictional element starts slipping, and gear ratio GR starts decreasing. In other words, inertia phase starts at t5.

At t6 upon elapse of a predetermined time from t4 when the disengagement side engagement pressure starts dropping, the disengagement side engagement pressure becomes zero, completing disengagement of the disengagement side frictional element. In addition, at t6, the engagement side engagement pressure has risen to the neighborhood of the line pressure PL because the predetermined time has past from t3 when the engagement side engagement pressure started rising. Because the original pressure port of the pressure regulator valve 106b~110b of the engagement side frictional element is opened to the largest opening degree, the ceiling of the engagement side engagement pressure is the line pressure PL that is the original pressure.

At t7, the engagement side engagement pressure becomes as high as the line pressure PL. On the other hand, the line pressure PL is reduced to the line pressure during shifting at low temperatures from t1 in succession. Therefore, the ceiling of the engagement side engagement pressure is the line pressure during shifting at low temperatures. Here, the line pressure during shifting at low temperatures is set as high as an oil pressure that is high enough to end the inertia phase so that the engagement side engagement pressure may rise high enough to end the inertia phase.

There is a reduction in speed at which torque capacity of the engagement side frictional element increases owing to the lowered ceiling of the engagement side engagement pressure, causing a reduction in drop in engine rpm. Therefore, the outbreak of shift shocks (jerk due to a projection in output shaft torque) is prevented because the quantity of an increase in output torque per a unit time becomes small.

At t8, the gear ratio GR becomes equal to a gear ratio GR2 after the upshift, ending the inertia phase. By this, the engagement pressure control is ended, and the line pressure during shifting at low temperatures is changed for the normal line pressure to calculate the line pressure PL. The engagement side engagement pressure starts rising because the ceiling of the engagement side engagement pressure rises with a rise of line pressure PL.

At t9 upon elapse of a predetermined time from t8, the engagement side engagement pressure rises to the neighborhood of the normal line pressure to secure engagement of the engagement side frictional element.

Select Control at Low Temperatures

Referring to FIGS. 22 and 23, there is description on a select control at low temperatures. FIG. 22 is a flow chart of a select control at low temperatures, and FIG. 23 is its time chart.

The flow chart shown in FIG. 22 begins with step S1 in which, when a select performed from N range position to run range (D range or R range) position during operation of the engine, the inhibitor switch 45 detects the selected range position. Depending on a kind of the selected range, the shift at low temperatures control section 404 decides which of the frictional elements should be hydraulically controlled as follows:

In step S10, when oil temperature detected by the oil temperature sensor 46 is lower than a predetermined temperature, the shift judgment at-low-temperature section 405 determines that the current select is a select at low temperatures. After the start of select at low temperatures, a select control at low temperatures, which includes an engagement pressure control at low temperatures and a line pressure control at low temperatures, is carried out.

A1 Engagement Control

In engagement pressure control for a frictional element A1 (hereinafter, A1 engagement control), an oil pressure order for engagement is maximized upon elapse of a predetermined timer T1 (steps S51, S52). Afterwards, the maximized engagement order continues to be issued in succession. Here, the predetermined timer T1 is set in response to oil temperature. In addition, in the first embodiment, a select start is the moment upon detecting a select as well as the moment upon maximizing an oil pressure order in an engagement pressure control, later described, of a frictional element A2 at low temperatures carried out simultaneously with this detection.

After maximizing the oil pressure order for the frictional element A1 (step S52), an inertia phase is ended when the progress of shift SK becomes equal to or bigger than SK2 (step S53). By this, the A1 engagement control is ended (step S53). In addition, a backing timer T2 is monitored as the backing of the judgment of end of A1 engagement control by the degree of shift SK so that, when the degree of shift SK fails to satisfy the relationship SK>SK2, the A1 engagement control is ended upon elapse of the predetermined time t2 (step S54).

A2 Engagement Control

On the other hand, in engagement pressure control for a frictional element A2 (hereinafter, A2 engagement control), an oil pressure order for engagement is maximized immediately after the start of select (step S61). This aims at completion of engagement of the frictional element A2 earlier than the first frictional element A1. Afterwards, the maximized order continues to be issued in succession, and the A2 engagement control is ended.

Line pressure control at select at low temperatures is the same as line pressure control at downshift at low temperatures and at upshift at low temperatures. But, you use properly a map to refer to from a line pressure map at N-D select at low temperatures and a line pressure map at N-R select at low temperatures (see FIG. 10).

In other words, in a line pressure control at a select from N range to D range at low temperatures, a line pressure at low temperatures is controlled by changing, as a map to refer to, the line pressure map at forward range for the line pressure map at N-D select at low temperatures (step S81). When the engagement pressure control at low temperatures is ended, the line pressure map at N-D select at low temperatures is changed for the line pressure map at forward range at low temperature map and the line pressure control at low temperatures is ended (steps S82, S83, S84).

In the same way as above, in a line pressure control at a select from N range to R range at low temperatures, a line pressure at low temperatures is controlled by changing, as a map to refer to, the line pressure map at forward range for the line pressure map at N-R select at low temperatures (step S81). When the engagement pressure control at low temperatures is ended, the line pressure map at N-D select at low temperatures is changed for the line pressure map at reverse range at low temperature map and the line pressure control at low temperatures is ended (steps S82, S83, 884).

At time t1, as shown in FIG. 23, engagement of the frictional element A2 starts by maximizing an oil pressure order for the frictional element A2 simultaneously with detection of a select at low temperatures. Afterwards, the maximized oil pressure order continues to be issued in succession. Issuing the engagement order for the frictional element A2 simultaneously with the start of select makes it possible to complete engagement of the frictional element A2 well before completion of engagement of the frictional element A1, to shorten oil pressure rise time for the frictional element A2, and to facilitate the progress of select at low temperatures.

In addition, at time t1 when the select starts, the line pressure PL is decreased to line pressure at select at low temperatures, and afterwards, this decreased oil pressure is maintained until the end of the select at low temperatures.

At t3 upon elapse of a predetermined time after t1 when the select starts, the engagement pressure of the frictional element A2 starts rising.

At t2 upon elapse of a predetermined timer T1, an oil pressure order for the frictional element A1 is maximized, and the maximized order continues to be issued in succession at t2 and onwards. In this way, by giving the oil pressure order to the frictional element A1 upon elapse of the time T1 from t1, simultaneous engagement of the frictional elements A1 and A2 is prevented and the order of engagement of the frictional element A1 and engagement of the second frictional element A2 is prevented from being mixed up by different run situations.

In other words, there is the possibility that different in magnitude of shift shocks at a select may occur due to mixing up of the order of engagement of the frictional element A1 and that of frictional element A2 caused by different driving conditions. To cope with this, the oil pressure order is given to the frictional element A1 upon elapse of the predetermined timer T1.

For example, let us consider a select from N range to R range at low temperatures, which engages the low & reverse brake L&R/B and the 3-5 reverse clutch 3-5R/C.

First, let us assume that the low & reverse brake L&R/B is selected as the first frictional element A1, and the 3-5 reverse clutch 3-5R/C as the second frictional element A2. In this case, the 3-5 reverse clutch 3-5R/C is engaged before the low & reverse brake L&R/B is engaged. First, rotation of the rotary shaft S1, which turns via the torque converter 3 accompanying the engine rpm, is transmitted via the engaged 3-5 reverse clutch 3-5R/C to the rotary shaft S5 and the carrier 16, causing them to turn. In this state, engaging the low & reverse brake L&R/B requires the rotating rotary shaft S5 and the like to come to a stop. Therefore, inertia energy is released from these members by engaging the low & reverse brake L&R/B.

On the other hand, let us assume that the 3-5 reverse clutch 3-5R/C is selected as the frictional element A1 and the low & reverse brake L&R/B is selected as the frictional element A2. In this case, the rotation of the rotary shaft S5 is not transmitted to the rotary shaft S5 and the carrier 16 because the low & reverse brake L&R/B is engaged before 3-5 reverse clutch 3-5R/C is engaged. The inertia energy of these member does not pose any problem when, in this state, the 3-5 reverse clutch 3-5R/C is engaged. Therefore, the output shaft torque changes upon engagement of the frictional element A1 are less in this case than the above-mentioned case where the low & reverse brake L&R/B is selected as the frictional element A1.

Therefore, the shift at-low-temperature control section 404 selects as the frictional element A1 the 3-5 reverse clutch 3-5R/C and as the frictional element A2 the low & reverse brake L&R/B, and give the oil pressure order to the low & reverse brake L&R/B simultaneously with start of select.

At t3 upon elapse of the predetermined time after t1 when the oil pressure order is given to the frictional element A2, the oil pressure of the frictional element A2 starts rising actually. In the same way, the oil pressure of the frictional element A1 starts rising actually at t4 upon elapse of the predetermined time after t2 when the oil pressure order is given to the frictional element A1.

The original pressure ports of the pressure regulator valves 106b~110b are opened to the largest degree by ordering the maximum oil pressures at time t1 and t2. By this, actual oil pressure rise times from t1, t2 to t3, t4 are sufficiently short enough and a drop in response characteristic of each of the friction elements A1 and A2 is reduced even if the fluidity of working oil drops at low temperatures.

And, the unevenness of time from the oil pressure order t1, t2 to the oil pressure rise t3, t4 is reduced because the maximum oil pressure is ordered in succession at time t1, t2 and afterwards. Moreover, outbreak of oil pressure vibrations in the pressure regulator valves 106b~110b for the frictional elements A1 and A2 is prevented.

Ceiling of each of the engagement pressure becomes equal to the line pressure PL that is the original pressure because the original pressure ports of the pressure regulator valves 106b~110b are fully opened to the largest degree. On the other hand, the line pressure PL is lowered in succession from t1 to the line pressure at select at low temperatures. Therefore, the ceiling of each of the frictional elements becomes equal to the line pressure at select at low temperatures.

At t5 upon elapse of a predetermined time from t4 when the engagement pressure of the frictional element A1 starts rising, Nt starts varying with respect to Ne and the degree of shift SK starts increasing. That is, the inertia phase starts at t5.

At t6, the engagement pressure of the frictional element A2 becomes equal to the line pressure at select at low temperatures. In the same way, at t7, the engagement pressure of the frictional element A1 becomes equal to the line pressure at select at low temperatures.

Because the ceiling of engagement pressures of the frictional elements A1 and A2 is lowered to the line pressure at select at low temperatures, speed at which the torque capacity of each of the frictional elements A1 and A2 drops and thus changes in output torque per unit time become small. Therefore, engagement shocks and a jerk of the vehicle body upon select operation are prevented.

The line pressure at select at low temperatures are set high enough to end the inertia phase so that the engagement pressure of each of the frictional elements A1 and A2 rises high enough to end the inertia phase.

At t8, the degree of shift SK reaches the predetermined value SK2 which indicates end of select, ending the inertia phase. By this, the select end judgment is made. At this moment, the line pressure at select at low temperatures is changed for the normal line pressure, and the engagement pressures of the frictional elements A1 and A2 start rising.

At t9 upon elapse of a predetermined time from t8, the engagement pressures of the frictional elements A1 and A2 rise to the neighborhood of the normal line pressure to secure engagement of the frictional elements.

Effects of First Embodiment

The first embodiment of a control system for automatic transmissions has the effects listed below:

(1) As mentioned above, the first embodiment of the automatic transmissions control system has the automatic transmission 1 configured to achieve a shift by engaging an engagement side frictional element and disengaging a disengagement side frictional element. The target shift stage determination section 401 determines whether or not there is a need for the shift in the automatic transmission 1. The line pressure regulator valve 132b regulates line pressure by draining ejection pressure of the oil pump O/P. The shift control section 402 controls the line pressure regulator valve 132b. The pressure regulator valve 106b~110b regulates the line pressure PL to give engagement pressure applied to the engagement side frictional element. The shift control section 402 controls the pressure regulator valve 106b~110b for the engagement side frictional element. The oil temperature sensor 46 detects oil temperature within the automatic transmission 1. The engagement pressure at-low-temperature regulation section gives, when oil temperature detected by the oil temperature sensor 46 is lower than a predetermined oil temperature and the target shift stage determination section 401 determine a need for the shift, an order for the maximum hydraulic pressure high enough for complete engagement to the pressure regulator valve 106b~110b for engagement side frictional element to start the shift, and continues to give the order for the maximum hydraulic pressure in succession until end of the shift.

When a shift is determined at low temperatures in which response characteristic of hydraulic control associated with the shift drops, an original pressure port is fully opened in degree to decrease a drop in response characteristic of at least engagement pressure applied to the engagement side frictional element by giving an order for the engagement pressure to the engagement side frictional element to start the shift by engagement pressure at-low-temperature regulation section 406. Unevenness of time until the engagement pressure on the engagement side starts rising is reduced by continuing to give the order for the maximum oil pressure in succession. Moreover, the pressure regulator valve 106b~110b for the engagement side frictional element is free from fluctuations and outbreak of oil pressure vibrations is prevented by continuing to give an order for constant oil pressure to the pressure regulator valve in succession until the end of the shift.

In addition, in the first embodiment, there is description on the type in which a disengagement side friction element is controlled by engagement pressure, but the same effects are obtained by applying the above-mentioned technology only to the engagement side friction element if the disengagement side friction element is constituted by one-way clutch and the like.

(2) The pressure regulator valve 106b~110b regulates the line pressure PL to give engagement pressure applied to the disengagement side frictional element, and the shift control section 402 that controls the pressure regulator valve 106b~110b for the disengagement side frictional element, and the target shift stage determination section 401 is configured to determine whether or not there is a need for an upshift. The engagement pressure at-low-temperature regulation section 406 gives, when oil temperature detected by the oil temperature sensor 46 is lower than a predetermined oil temperature and the target shift stage determination section 401 determine a need for the shift, an order for the minimum hydraulic pressure to the pressure regulator valve for the disengagement side frictional element upon elapse of a first period T1 (corresponding to a first period) beginning with the above-mentioned starting the shift (when the order for the maximum hydraulic pressure high enough for complete engagement to the pressure regulator valve for the engagement side frictional element).

There is an effect that engine race caused due to delay in response characteristic of engagement pressure applied to the engagement side frictional element is appropriately prevented by decreasing the engagement pressure to the disengagement side frictional element upon elapse of the predetermined period T1 which is based on the oil temperature at an upshift at low temperatures.

(3) As mentioned above, the first embodiment of the automatic transmissions control system has the automatic transmission 1 configured to achieve a shift by engaging an engagement side frictional element and disengaging a disengagement side frictional element. The target shift stage determination section 401 determines whether or not there is a need for a downshift in the automatic transmission 1. The line pressure regulator valve 132b regulates line pressure PL by draining ejection pressure of an oil pump O/P. The shift control section 402 controls the line pressure regulator valve 132b. The pressure regulator valve 106b~110b regulates the line pressure PL to give engagement pressure applied to the engagement side frictional element. The shift control section 402 controls the pressure regulator valve 106b~110b for the engagement side frictional element. The pressure regulator valve 106b~110b regulates the line pressure to give engagement pressure applied to the disengagement side frictional element. The shift control section 402 controls the pressure regulator valve for the disengagement side frictional element. The oil temperature sensor 46 detects oil temperature within the automatic transmission 1. The engagement pressure at-low-temperature regulation section 406 gives, when oil temperature detected by the oil temperature sensor 46 is lower than a predetermined oil temperature and the target shift stage determination section 401 determine a need for the shift (downshift), an order for the minimum hydraulic pressure for complete disengagement to the pressure regulator valve 106b~110b for the disengagement side frictional element to start the shift, gives an order for the maximum hydraulic pressure high enough to complete engagement to the pressure regulator valve 106b~110b for the engagement side frictional element upon elapse of a predetermined period T1 (corresponding to a second period) beginning with the starting the shift, and continues to give the order for the maximum hydraulic pressure in succession until end of the shift.

At a downshift at low temperatures, when a shift is determined at low temperatures in which response characteristic of hydraulic control associated with the shift drops, the pressure regulator valve 106b~110b for the engagement side frictional element is free from fluctuations and outbreak of oil pressure vibrations is prevented by continuing to give an order for constant oil pressure to the pressure regulator valve 106b~110b in succession until the end of the shift. Moreover, when a downshift is determined, the engagement pressure applied to the disengagement side frictional element is lowered to start the shift, facilitating the progress of the shift. Since the engagement pressure applied to the engagement side friction element needs to rise to an oil pressure high enough to end an inertia phase by the end of the inertia phase, there is an effect that outbreak of interlock due to a delay in draining hydraulic fluid from the disengagement side frictional element is appropriately prevented by increasing engagement pressure applied to the engagement side frictional element upon elapse of the predetermined time T1, which is based on oil temperature, beginning with start of the downshift.

(4) The line pressure at-low-temperature regulation section 407 gives, when oil temperature detected by the oil temperature sensor is lower than a predetermined oil temperature and the target shift stage determination section 401 determine a need for the shift, an order to the line pressure regulator valve 132b for a predetermined period beginning with the starting the shift so that the line pressure is determined based on an input torque to the automatic transmission and as high as the lower limit hydraulic pressure capable of ending inertia phase.

Shift shocks are avoided because high level of line pressure PL is prevented unaltered from being used as the engagement pressure applied to the engagement side frictional element by the line pressure at-low-temperature regulation section 407. That is, immediately after start of shift resulting from judgment that the shift is a shift at low temperatures, it is ordered to lower line pressure PL from the level of line pressure PL during shifting at normal temperatures to a level as high as the lower limit capable of ending the inertia phase. The line pressure PL, which is supplied as a source of the engagement pressure, is lowered to the above-mentioned level and high level line pressure PL unaltered will not be used as a source of the engagement pressure until the engagement pressure applied to the engagement side frictional element rises, thus restraining the rapid rise of engagement pressure at such oil pressure in the neighborhood of the lower limit capable of ending inertia phase. As a result, rapid shift shocks can be avoided. First, the line pressure regulator valve 132b does not need to control anything but one quantity as compared to the pressure regulator valves 106b~110b. Second, the line pressure regulator valve 132b is always in a pressure equilibrium state. Third, a constant oil pressure order for the line pressure regulator valve 132b is issued for a predetermined period in succession during shifting and the period for which the constant oil pressure order is issued is long. Because of them, there is an effect that the oil pressure vibrations in the line pressure regulator valve 132b are prevented from occurring.

(5) The line pressure at-low-temperature regulation section 407 gives, when oil temperature detected by the oil temperature sensor 46 is lower than a predetermined oil temperature and the target shift stage determination section 401 determine a need for the shift, an order to the line pressure regulator valve 132b for a predetermined period (corresponding to a third period) beginning with the starting the shift for a hydraulic pressure lower than the line pressure that is ordered when oil temperature detected by the oil temperature sensor 46 is equal to or higher than the predetermined oil temperature and the target shift stage determination section determine a need for the shift.

Shift shocks are avoided because high level of line pressure PL is prevented unaltered from being used as the engagement pressure applied to the engagement side frictional element by the line pressure at-low-temperature regulation section 407. First, the line pressure regulator valve 132b does not need to control anything but one quantity as compared to the pressure regulator valves 106b~110b. Second, the line pressure regulator valve 132b is always in a pressure equilibrium state. Third, a constant oil pressure order for the line pressure regulator valve 132b is issued for a predetermined period in succession during shifting and the period for which the constant oil pressure order is issued is long, Because of them, there is an effect that the oil pressure vibrations in the line pressure regulator valve 132b are prevented from occurring. Further, for the predetermined period (third period), it is enough that the time needed to end the shift is secured. For example, it may be a predetermined period that may be set based on the degree of shift SK or a predetermined time (backing timer T2) that is considered to be long enough to end the shift.

(6) As mentioned above, the first embodiment of the automatic transmissions control system has the automatic transmission 1 configured to engages frictional elements A1, A2 (first frictional element) based on a lever operation from a non-run range (P range, N range) to a run range (D range, R range and the like). The target shift stage determination section 401 (corresponding to a lever operation detection section) detects the lever operation based on a signal from an inhibitor switch 45. The line pressure regulator valve 132b regulates line pressure by draining ejection pressure of an oil pump O/P. The shift control section 402 (line pressure regulation section) controls the line pressure regulator valve 132b. The pressure regulator valves 106b~110b regulate the line pressure to give engagement pressures applied to the frictional elements A1, A2. The shift control section 402 controls the pressure regulator valves 106b~110b. The oil temperature sensor 46 that detects oil temperature within the automatic transmission 1. The engagement pressure at-low-temperature regulation section 406 gives, when oil temperature detected by the oil temperature sensor 46 is lower than a predetermined oil temperature and the inhibitor switch 45 determines the lever operation, an order for the maximum hydraulic pressure high enough to complete engagement to the pressure regulator valves 106b~110b to start the shift, and continues to give the order for the maximum hydraulic pressure in succession until end of the shift.

At a select at low temperatures, when a shift is determined at low temperatures in which response characteristic of hydraulic control associated with the select drops, an original pressure port of the pressure regulator valve 106b~110b for the engagement side friction element is fully opened in degree to start the shift thereby to decrease a drop in response characteristic of engagement pressure applied to the engagement side frictional element by engagement pressure at-low-temperature regulation section 406. Unevenness of time until the engagement pressure on the engagement side starts rising is reduced by continuing to give the order for the maximum oil pressure in succession. Moreover, the pressure regulator valve 106b~110b for the engagement side frictional element is free from fluctuations and outbreak of oil pressure vibrations is prevented by continuing to give an order for constant oil pressure to the pressure regulator valve in succession until the end of the shift.

(7) The line pressure at-low-temperature regulation section 407 gives, when oil temperature detected by the oil temperature sensor 46 is lower than a predetermined oil temperature and the inhibitor switch 45 detects the lever operation, an order for hydraulic pressure to the line pressure regulator valve 132b for a predetermined period (a third period) beginning with start of engagement of frictional elements A1, A2

(first frictional element) so that the line pressure may be determined based on an input torque to the automatic transmission and as high as the lower limit hydraulic pressure capable of ending inertia phase.

Shift shocks are avoided because high level of line pressure PL is prevented unaltered from being used as the engagement pressure applied to the engagement side frictional element by the line pressure at-low-temperature regulation section 407. That is, immediately after start of shift resulting from judgment that the shift is a shift at low temperatures, it is ordered to lower line pressure PL from the level of line pressure PL during shifting at normal temperatures to a level as high as the lower limit capable of ending the inertia phase. The line pressure PL, which is supplied as a source of the engagement pressure, is lowered to the above-mentioned level and high level line pressure PL unaltered will not be used as a source of the engagement pressure until the engagement pressure applied to the engagement side frictional element rises, thus restraining the rapid rise of engagement pressure at such oil pressure in the neighborhood of the lower limit capable of ending inertia phase. As a result, rapid shift shocks can be avoided. First, the line pressure regulator valve 132b does not need to control anything but one quantity as compared to the pressure regulator valves 106b~110b. Second, the line pressure regulator valve 132b is always in a pressure equilibrium state. Third, a constant oil pressure order for the line pressure regulator valve 132b is issued for a predetermined period in succession during shifting and the period for which the constant oil pressure order is issued is long. Because of them, there is an effect that the oil pressure vibrations in the line pressure regulator valve 132b are prevented from occurring.

(8) The line pressure at-low-temperature regulation section 407 provides, when oil temperature detected by the oil temperature sensor 46 is lower than a predetermined oil temperature and an inhibitor switch 45 detects the lever operation, an order to the line pressure regulator valve 132b for a predetermined period (corresponding to a third period) beginning with the starting the shift for a hydraulic pressure lower than the line pressure that is ordered when oil temperature detected by the oil temperature sensor 46 is equal to or higher than the predetermined oil temperature and the inhibitor switch 45 detects the lever operation.

Shift shocks are avoided because high level of line pressure PL is prevented unaltered from being used as the engagement pressure applied to the engagement side frictional element by the line pressure at-low-temperature regulation section 407. First, the line pressure regulator valve 132b does not need to control anything but one quantity as compared to the pressure regulator valves 106b~110b. Second, the line pressure regulator valve 132b is always in a pressure equilibrium state. Third, a constant oil pressure order for the line pressure regulator valve 132b is issued for a predetermined period in succession during shifting and the period for which the constant oil pressure order is issued is long. Because of them, there is an effect that the oil pressure vibrations in the line pressure regulator valve 132b are prevented from occurring, Further, for the predetermined period (third period), it is enough that the time needed to end the shift is secured. For example, it may be a predetermined period that may be set based on the degree of shift SK or a predetermined time (backing timer T2) that is considered to be long enough to end the shift.

Other Embodiments

In the above, there is description on the best mode of implementing the present invention along with the first embodiment, but the present invention should not be limited to this embodiment. The present invention includes any modifications with departing the spirit of the invention.

For example, the present invention is applicable to an automatic transmission having a planetary gear train and hydraulic circuit different from those used in the automatic transmission 1 of the first embodiment. And, the predetermined timer T1 used in the downshift control at low temperatures for an engagement side frictional element may be triggered for up-counting by any one of a judgment of shift and an order for the minimum hydraulic pressure if they occur at different timings. The predetermined timer T1 used in the upshift control at low temperatures for a disengagement side frictional element may be triggered for up-counting by any one of a judgment of shift and an order for the maximum hydraulic pressure if they occur at different timings. And so in select control at low temperatures.

General Interpretion of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The terms "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An automatic transmission control system comprising:
a shift determination section configured to determine an existence of a shift condition that requires a shift operation in an automatic transmission including at least first and second frictional elements that performs the shift operation by selective engagement of the first frictional element and selective disengagement of the second frictional element;
a shift control section configured to selectively control a line pressure regulator valve that regulates line pressure by draining ejection pressure of an oil pump and first and second engagement-pressure pressure regulator valves that regulate line pressure to provide engagement pressure to the first and second frictional elements;
an oil temperature detection section configured to detect oil temperature within the automatic transmission; and
an engagement pressure at-low-temperature regulation section configured to selectively control at least one of the first and second engagement-pressure regulator valves, when the oil temperature detected by the oil temperature detection section is lower than a predetermined oil temperature and the shift determination section determines the existence of the shift condition for requiring the shift operation, either
to issue an order of a maximum hydraulic pressure to the first engagement-pressure regulator valve to engage the first frictional element to start a shift with the order of the maximum hydraulic pressure being continuously maintained during the shift until the shift ends, or
to issue an order of a minimum hydraulic pressure to the second engagement-pressure regulator valve to disengage the second frictional element to start a downshift as the shift operation, and to issue an order of a maximum hydraulic pressure to the first engagement-pressure regulator valve to engage the first frictional element upon elapse of a predetermined period from the start of the downshift with an order of a minimum hydraulic pressure to the first frictional element being continuously maintained during the predetermined period from the start of the down shift and then the order of the maximum hydraulic pressure to the first frictional element being continuously maintained until the downshift ends.

2. The automatic transmission control system as recited in claim 1, wherein
the engagement pressure at-low-temperature regulation section is further configured to control the second engagement-pressure regulator valve to the minimum hydraulic pressure upon elapse of a predetermined period from starting an upshift as the shift operation, upon the oil temperature detection section detecting the oil temperature is lower than the predetermined oil temperature and the shift determination section determining an existence of an upshift condition for requiring the upshift, when the engagement pressure at-low-temperature regulation section is controlling the first engagement-pressure regulator valve to continuously provide the maximum hydraulic pressure to engage the first frictional element until the upshift ends.

3. The automatic transmission control system as recited in claim 1, further comprising
a line pressure at-low-temperature regulation section configured to control the line pressure regulator valve based on an input torque to the automatic transmission for a predetermined period from starting the shift operation so that line pressure is as high as a lower limit hydraulic pressure required to end an inertia phase, upon the oil temperature detection section detecting the oil temperature is lower than a predetermined oil temperature and the shift determination section determining the existence of the shift condition.

4. The automatic transmission control system as recited in claim 2, further comprising
a line pressure at-low-temperature regulation section configured to control the line pressure regulator valve based on an input torque to the automatic transmission for a predetermined period from starting the shift operation so that line pressure is as high as a lower limit hydraulic pressure required to end an inertia phase, upon the oil temperature detection section detecting the oil temperature is lower than a predetermined oil temperature and the shift determination section determining the existence of the shift condition.

5. The automatic transmission control system as recited in claim 1, further comprising
a line pressure at-low-temperature regulation section configured to control the line pressure regulator valve for a predetermined period from starting the shift operation, upon the oil temperature detection section detecting the oil temperature is lower than a predetermined oil temperature and the shift determination section determining the existence of the shift condition, such that the line pressure regulator valve provides a hydraulic pressure that is lower than the line pressure that is used when the oil temperature detected by the oil temperature detection section is equal to or higher than the predetermined oil temperature and the shift determination section determine determines the existence of the shift condition.

6. The automatic transmission control system as recited in claim 2, further comprising
a line pressure at-low-temperature regulation section configured to control the line pressure regulator valve for a predetermined period from starting the shift operation, upon the oil temperature detection section detecting the oil temperature is lower than a predetermined oil temperature and the shift determination section determining the existence of the shift condition, such that the line pressure regulator valve provides a hydraulic pressure that is lower than the line pressure that is used when the oil temperature detected by the oil temperature detection section is equal to or higher than the predetermined oil temperature and the shift determination section determine determines the existence of the shift condition.

7. The automatic transmission control system as recited in claim 1, wherein
the shift determination section is further configured to a detect a lever operation from a non-run range to a run range for engaging the first frictional element as the shift condition requiring the shift operation; and
the engagement pressure at-low-temperature regulation section is configured to issue the order of the maximum hydraulic pressure to the first engagement-pressure regulator valve to engage the first friction element to start the shift, with the order of the maximum hydraulic pressure being continuously maintained until the shift ends, upon the oil temperature detection section detecting the oil temperature is lower than the predetermined oil temperature and the shift determination section determining an existence of the lever operation as the shift condition for requiring the shift.

8. The automatic transmission control system as recited in claim 7, further comprising a line pressure at-low-temperature regulation section configured to control the line pressure regulator valve based on an input torque to the automatic transmission for a predetermined period from starting the shift operation so that line pressure is as high as a lower limit hydraulic pressure required to end an inertia phase, upon the oil temperature detection section detecting the oil temperature is lower than a predetermined oil temperature and the shift determination section determining the existence of the shift condition.

9. The automatic transmission control system as recited in claim 7, further comprising a line pressure at-low-temperature regulation section configured to control the line pressure regulator valve for a predetermined period from starting the shift operation, upon the oil temperature detection section detecting the oil temperature is lower than a predetermined oil temperature and the shift determination section determining the existence of the shift condition, such that the line pressure regulator valve provides a hydraulic pressure that is lower than the line pressure that is used when the oil temperature detected by the oil temperature detection section is equal to or higher than the predetermined oil temperature and the shift determination section determine determines the existence of the shift condition.

10. An automatic transmission control system comprising:

shift determination means for determining an existence of a shift condition that requires a shift operation in an automatic transmission including at least first and second frictional elements that performs the shift operation by selective engagement of the first frictional element and selective disengagement of the second frictional element;

shift control means for selectively controlling a line pressure regulator valve that regulates line pressure by draining ejection pressure of an oil pump and first and second engagement-pressure pressure regulator valves that regulate line pressure to provide engagement pressure to the first and second frictional elements;

oil temperature detection means for detecting oil temperature within the automatic transmission; and engagement pressure at-low-temperature regulation means for selectively controlling at least one of the first and second engagement-pressure regulator valves, when the oil temperature that was detected is lower than a predetermined oil temperature and the shift condition for requiring the shift operation was determined to exist for either issuing an order of a maximum hydraulic pressure to the first engagement-pressure regulator valve to engage the first frictional element to start a shift with the order of the maximum hydraulic pressure being continuously maintained during the shift until the shift ends, or issuing an order of a minimum hydraulic pressure to the second engagement-pressure regulator valve to disengage the second frictional element to start a downshift as the shift operation and issuing an order of a maximum hydraulic pressure to the first engagement-pressure regulator valve to engage the first frictional element upon elapse of a predetermined period from the start of the downshift with an order of a minimum hydraulic pressure to the first frictional element being continuously maintained during the predetermined period from the start of the down shift and then the order of the maximum hydraulic pressure being continuously maintained until the downshift ends.

11. An automatic transmission control method comprising:

determining an existence of a shift condition that requires a shift operation in an automatic transmission including at least first and second frictional elements that performs the shift operation by selective engagement of the first frictional element and selective disengagement of the second frictional element;

selectively controlling a line pressure regulator valve that regulates line pressure by draining ejection pressure of an oil pump and first and second engagement-pressure pressure regulator valves that regulate line pressure to provide engagement pressure to the first and second frictional elements;

detecting oil temperature within the automatic transmission; and selectively controlling at least one of the first and second engagement-pressure regulator valves, when the oil temperature that was detected is lower than a predetermined oil temperature and the shift condition for requiring the shift operation was determined to exist, by either issuing an order of a maximum hydraulic pressure to the first engagement-pressure regulator valve to engage the first frictional element to start a shift with the order of the maximum hydraulic pressure being continuously maintained during the shift until the shift ends, or issuing an order of a minimum hydraulic pressure to the second engagement-pressure regulator valve to disengage the second frictional element to start a downshift as the shift operation and issuing an order of a maximum hydraulic pressure to the first engagement-pressure regulator valve to engage the first frictional element upon elapse of a predetermined period from the start of the downshift with an order of a minimum hydraulic pressure to the first frictional element being continuously maintained during the predetermined period from the start of the down shift and then the order of the maximum hydraulic pressure being continuously maintained until the downshift ends.

* * * * *